(12) United States Patent
Mori et al.

(10) Patent No.: US 8,745,354 B2
(45) Date of Patent: Jun. 3, 2014

(54) COMPUTER SYSTEM FOR RESOURCE ALLOCATION BASED ON ORDERS OF PROIRITY, AND CONTROL METHOD THEREFOR

(75) Inventors: Nobuhito Mori, Kawasaki (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 13/131,357

(22) PCT Filed: Mar. 2, 2011

(86) PCT No.: PCT/JP2011/054727
§ 371 (c)(1),
(2), (4) Date: May 26, 2011

(87) PCT Pub. No.: WO2012/117534
PCT Pub. Date: Sep. 7, 2012

(65) Prior Publication Data
US 2012/0226885 A1 Sep. 6, 2012

(51) Int. Cl.
*G06F 12/02* (2006.01)
(52) U.S. Cl.
USPC ............................. 711/170; 711/154; 711/158
(58) Field of Classification Search
USPC .......................................... 711/154, 158, 170
See application file for complete search history.

(56) References Cited

U.S. PATENT DOCUMENTS

| 7,035,882 | B2 | 4/2006 | Takeda et al. | |
| 7,415,490 | B2 | 8/2008 | Takeda et al. | |
| 2006/0095706 | A1* | 5/2006 | Aoyama | 711/171 |
| 2007/0050588 | A1* | 3/2007 | Tabata et al. | 711/165 |
| 2007/0174567 | A1* | 7/2007 | Deguchi et al. | 711/162 |
| 2009/0043982 | A1 | 2/2009 | Kano et al. | |
| 2009/0119529 | A1 | 5/2009 | Kono et al. | |
| 2009/0150639 | A1 | 6/2009 | Ohata | |
| 2012/0226856 | A1* | 9/2012 | Hayashi et al. | 711/114 |

FOREIGN PATENT DOCUMENTS

| EP | 2 302 498 A1 | 3/2011 |
| JP | 2003-015915 | 1/2003 |
| JP | 2004-070403 | 3/2004 |
| JP | 2009-116436 | 5/2009 |
| JP | 2009-140356 | 6/2009 |
| WO | WO 2010/122679 A1 | 10/2010 |

OTHER PUBLICATIONS

Vmware Virtual Machine File System: Technical Overview and Best Practices, version 1.0, Paper No. WP-022-PRD-01-01; 2007; pp. 1-19; retrieved on Jan. 14, 2011; http://www.vmware.com/pdf.vmfs-best-practices-wp.pdf.
PCT International Search Report and Written Opinion on application No. PCT/JP2011/054727 dated Apr. 19, 2011; 5 pages.

* cited by examiner

*Primary Examiner* — John Lane
(74) *Attorney, Agent, or Firm* — Foley & Lardner LLP

(57) ABSTRACT

To reduce the number of data copies between volume pools by preventing occurrence of unevenness of resource usage between the pools, provided is a computer system including: storage apparatus; and host computer coupled to the storage apparatus, the storage apparatus including physical storage device, the storage apparatus holding information associating virtual volumes and pools each including real storage areas of the physical storage device, the storage apparatus allocating, to the virtual volume of a write destination designated by the host computer, the real storage areas included in each of the plurality of pools corresponding to the virtual volume of the write destination, and storing the data therein, the computer system being configured to: determine, based on the information held by the storage apparatus, orders of priority of the volumes of the write destination by the host computers; and hold the determined orders of priority.

13 Claims, 21 Drawing Sheets

| VIRTUAL VOLUME | | | LOGICAL VOLUME | | |
|---|---|---|---|---|---|
| ID | START LBA | END LBA | ID | START LBA | END LBA |
| 3 | 0x00000000 | 0x0001af0f | 0 | 0x00000000 | 0x0001af0f |
| | 0x0001af10 | 0x0001ffff | 0 | 0x00030000 | 0x000350ef |
| | 0x00020000 | 0x0020ffff | 0 | 0x00050000 | 0x000500ff |
| | 0x00021000 | 0x0008ffff | 1 | 0x00000000 | 0x0006efff |
| | ⋮ | ⋮ | ⋮ | ⋮ | ⋮ |

FIG. 9

| LOGICAL VOLUME ID | START LBA | END LBA |
|---|---|---|
| 0 | 0x0001af10 | 0x0002ffff |
| 0 | 0x000350f0 | 0x0004ffff |
| ⋮ | ⋮ | ⋮ |

| HOST SIDE INFORMATION | | | STORAGE SIDE INFORMATION | | | | |
|---|---|---|---|---|---|---|---|
| HOST VOLUME ID | FREE CAPACITY | ... | STORAGE ID | STORAGE VOLUME ID | POOL ID | POOL FREE CAPACITY | ... |
| 1 | 10GB | ... | storage 1 | Vol 1 | pool 1 | 300GB | ... |
| 2 | 100GB | ... | storage 2 | Vol 4 | pool 6 | 175GB | ... |
| 3 | 50GB | ... | storage 3 | Vol 2 | pool 7 | 1024GB | ... |
| 4 | 30GB | ... | storage 4 | Vol 2 | pool 3 | 105GB | ... |
| 5 | 50GB | ... | storage 2 | Vol 3 | - | MAX | ... |
| ⋮ | ⋮ | ⋮ | ⋮ | ⋮ | ⋮ | ⋮ | ⋮ |
| 1601 | 1602 | | 1603 | 1604 | 1605 | 1606 | |

FIG. 11

| PRIORITY ORDER | HOST VOLUME ID |
|---|---|
| 1 | 3 |
| 2 | 5 |
| 3 | 1 |
| ⋮ | ⋮ |

FIG. 12

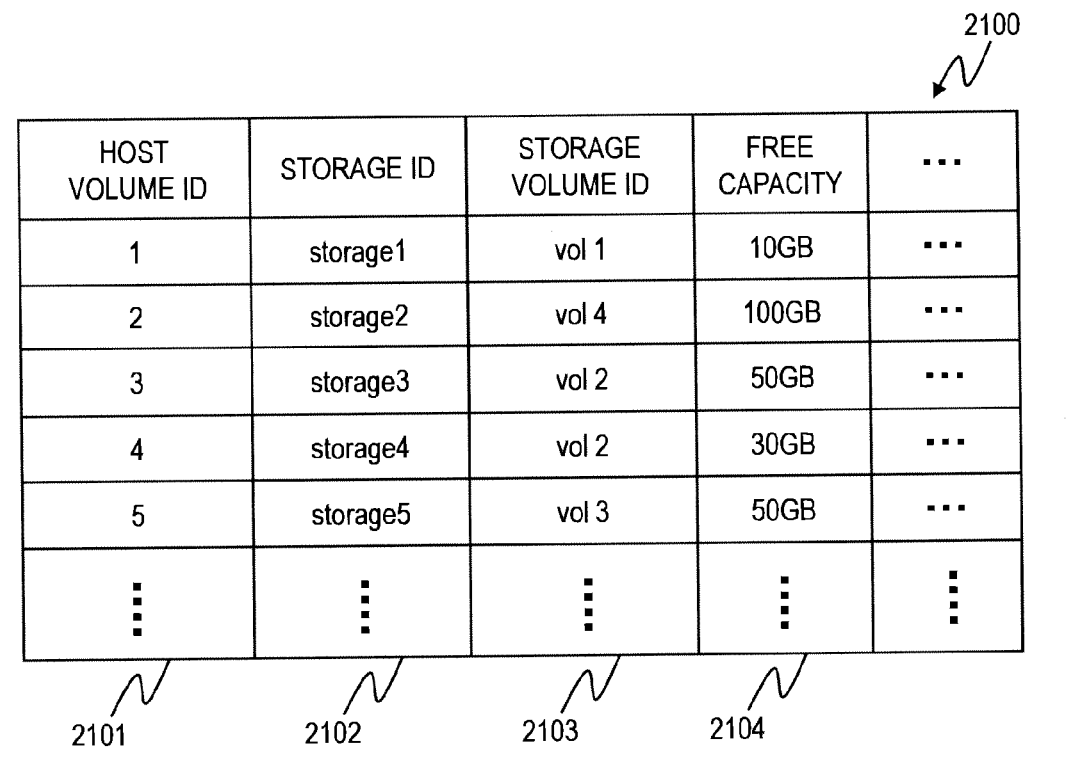

| HOST VOLUME ID | STORAGE ID | STORAGE VOLUME ID | FREE CAPACITY | ... |
|---|---|---|---|---|
| 1 | storage1 | vol 1 | 10GB | ... |
| 2 | storage2 | vol 4 | 100GB | ... |
| 3 | storage3 | vol 2 | 50GB | ... |
| 4 | storage4 | vol 2 | 30GB | ... |
| 5 | storage5 | vol 3 | 50GB | ... |
| ⋮ | ⋮ | ⋮ | ⋮ | ⋮ |

FIG. 19

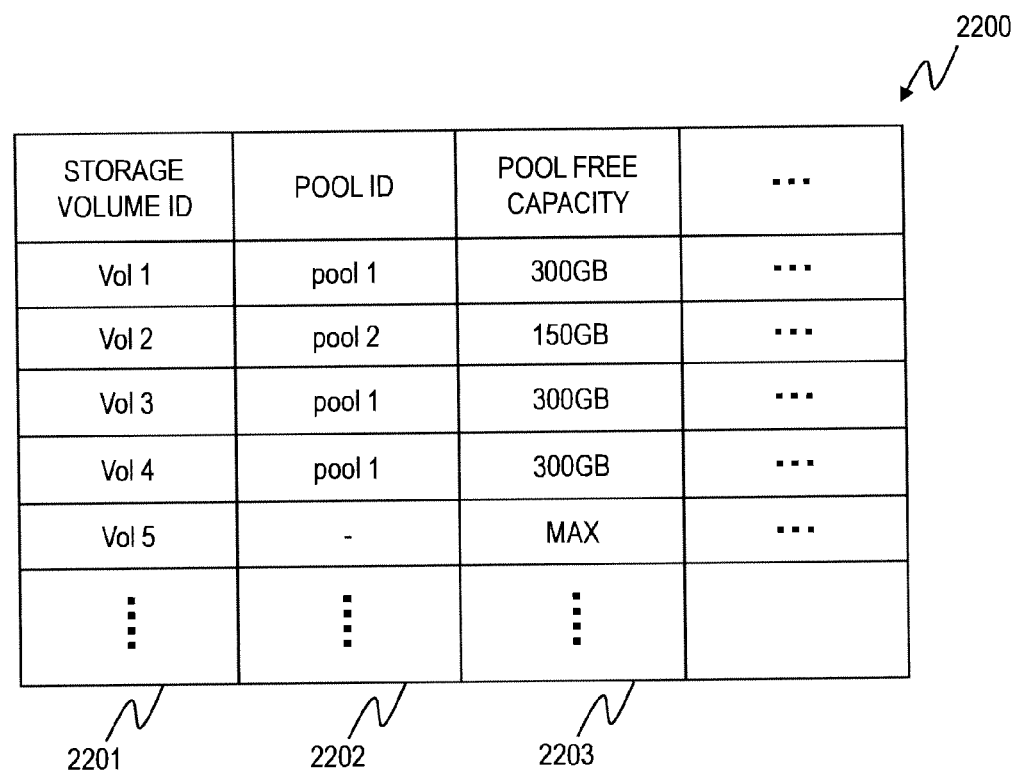

| STORAGE VOLUME ID | POOL ID | POOL FREE CAPACITY | ... |
|---|---|---|---|
| Vol 1 | pool 1 | 300GB | ... |
| Vol 2 | pool 2 | 150GB | ... |
| Vol 3 | pool 1 | 300GB | ... |
| Vol 4 | pool 1 | 300GB | ... |
| Vol 5 | - | MAX | ... |
| ⋮ | ⋮ | ⋮ | |

FIG. 20

| HOST VOLUME ID | STORAGE ID | STORAGE VOLUME ID | FREE CAPACITY | IMAGE FILE | ... |
|---|---|---|---|---|---|
| 1 | storage1 | vol 1 | 10GB | img1, img2 | ... |
| 2 | storage2 | vol 4 | 100GB | - | ... |
| 3 | storage3 | vol 2 | 50GB | img3 | ... |
| 4 | storage4 | vol 2 | 30GB | img5, img6 | ... |
| 5 | storage5 | vol 3 | 50GB | img4 | ... |
| ⋮ | ⋮ | ⋮ | ⋮ | ⋮ | ⋮ |

FIG. 21

COMPUTER SYSTEM FOR RESOURCE ALLOCATION BASED ON ORDERS OF PROIRITY, AND CONTROL METHOD THEREFOR

TECHNICAL FIELD

This invention relates to a storage system, and more particularly, to capacity management of a storage volume pool.

BACKGROUND ART

There is a technology referred to as thin provisioning such as that disclosed in JP 2003-15915 A (Patent Document 1). The thin provisioning is a technology for allocating virtual volumes to a host computer. The virtual volumes are volumes to which data storage areas are allocated from pooled physical disks only after the host computer writes data in the virtual volumes.

There is a server virtualization technology for constructing a plurality of virtual machines (VMs) on one host computer. In the server virtualization technology, a technology disclosed in "VMware Virtual Machine File System: Technical Overview and Best Practices" (Non-patent Document 1) is utilized. According to this technology, a hypervisor that is a management program of server virtualization centrally manages a plurality of volumes to provide a single data storage area to an administrator.

PRIOR ART DOCUMENTS

Patent Document

Patent Document 1: JP 2003-15915 A

Non-patent Document

Non-patent Document 1: "VMware Virtual Machine File System: Technical Overview and Best Practices", pp. 6 to 11, [online], published by VMware Inc., [retrieved on Jan. 14, 2011], Internet <URL: http://www.vmware.com/pdf/vmfs-best-practices-wp.pdf>

DISCLOSURE OF THE INVENTION

Problems to be Solved by the Invention

In the conventional technology, when virtual volumes are allocated to the host computer, the host computer does not recognize information of a volume pool for actually storing data of the virtual volumes while recognizing only free capacities of the virtual volumes.

Thus, when the administrator creates a VM in an environment where a plurality of virtual volumes curved from a plurality of volume pools are allocated to the host computer, the hypervisor creates an image file that is a substance of the VM in the virtual volume of a large free capacity without taking a resource usage (used capacity or I/O (Input/Output) amount) of the volume pools into consideration. As a result, unevenness in resource usage may occur among the volume pools or may even be facilitated.

This unevenness causes problems, namely, "even while the other volume pools have free capacities, a capacity of a particular volume pool is depleted, disabling writing in the virtual volume cut off from the pool", and "I/O performance deteriorates". When unevenness occurs, data must be copied between the volume pools to eliminate the unevenness. However, this necessitates temporary use of resources (memory, or network band) of the storage for data copying, creating a possibility of deteriorating the I/O performance.

Means for Solving the Problems

In order to solve the problems, for example, a configuration specified in claims is employed.

This application includes a plurality of means for solving the above-mentioned problems. There is provided as an example a computer system, including: one or more storage apparatuses; and one or more host computers coupled to the one or more storage apparatuses, each of the one or more host computers including: a first interface coupled to the one or more storage apparatuses; a first processor coupled to the first interface; and a first storage device coupled to the first processor, the first processor controlling one or more virtual machines each executing one or more application programs, each of the one or more storage apparatuses including: a controller coupled to the one or more host computers; and one or more physical storage devices coupled to the controller, the each of the one or more storage apparatuses holding information associating a plurality of virtual volumes and a plurality of pools each including real storage areas of the one or more physical storage devices, when a request to write data designating one of the plurality of virtual volumes as a volume of a write destination is received from the one or more host computers, the each of the one or more storage apparatuses allocating, to the virtual volume of the write destination, the real storage areas included in each of the plurality of pools corresponding to the virtual volume of the write destination, and storing the data in the allocated real storage areas, the computer system being configured to: determine, based on the information held by the each of the one or more storage apparatuses, orders of priority of the volumes of the write destination by the one or more host computers; and hold the determined orders of priority.

Effects of the Invention

According to an embodiment of this invention, the number of data copies between volume pools of the storage side may be reduced by preventing occurrence of unevenness of resource usage between the pools.

BRIEF DESCRIPTION OF THE DRAWINGS

FIG. 9 is an explanatory diagram illustrating an example of a virtual volume management table held by a virtual volume manager according to the first embodiment of this invention.

FIG. 10 is an explanatory diagram illustrating an example of an unused area management table held by the virtual volume manager according to the first embodiment of this invention.

FIG. 11 is an explanatory diagram illustrating an example of a host storage volume management table held by a management software according to the first embodiment of this invention.

FIG. 12 is an explanatory diagram illustrating an example of a write destination candidate volume management table held by an additional module according to the first embodiment of this invention.

FIG. 19 is an explanatory diagram illustrating an example of a host volume management table held by the hypervisor according to the first embodiment of this invention.

FIG. 20 is an explanatory diagram illustrating an example of a storage volume management table held by the storage agent according to the first embodiment of this invention.

FIG. 21 is an explanatory diagram illustrating an example of a host volume management table held by the hypervisor according to the second embodiment of this invention.

MODES FOR CARRYING OUT THE INVENTION

Hereinafter, referring to the accompanying drawings, embodiments of this invention are described.

First Embodiment

Referring to FIGS. 1 to 15, FIG. 19, and FIG. 20, a first embodiment of this invention is described.

Figure 1:
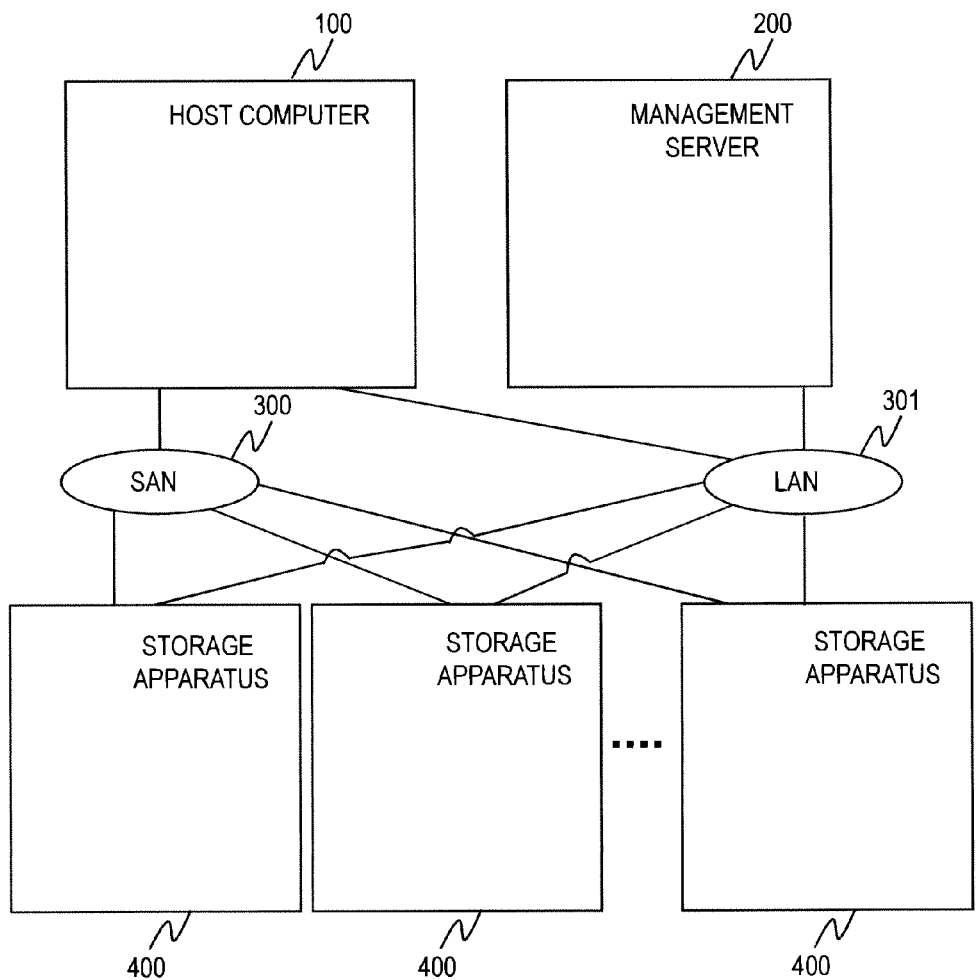
FIG. 1 is a block diagram illustrating a general outline of an information technology (IT) system according to a first embodiment of this invention.

FIG. 1 is a block diagram illustrating a general outline of an information technology (IT) system according to the first embodiment of this invention.

This system includes a host computer 100, a management server 200, and one or more storage apparatuses 400, which are mutually coupled via a local area network (LAN) 301. The storage apparatuses 400 and the host computer 100 are mutually coupled via a storage area network (SAN) 300. This system may include a plurality of host computers. In such a case, the plurality of host computers may be mutually coupled via a LAN for data transfer in addition to the LAN 301 for management.

Figure 2A:
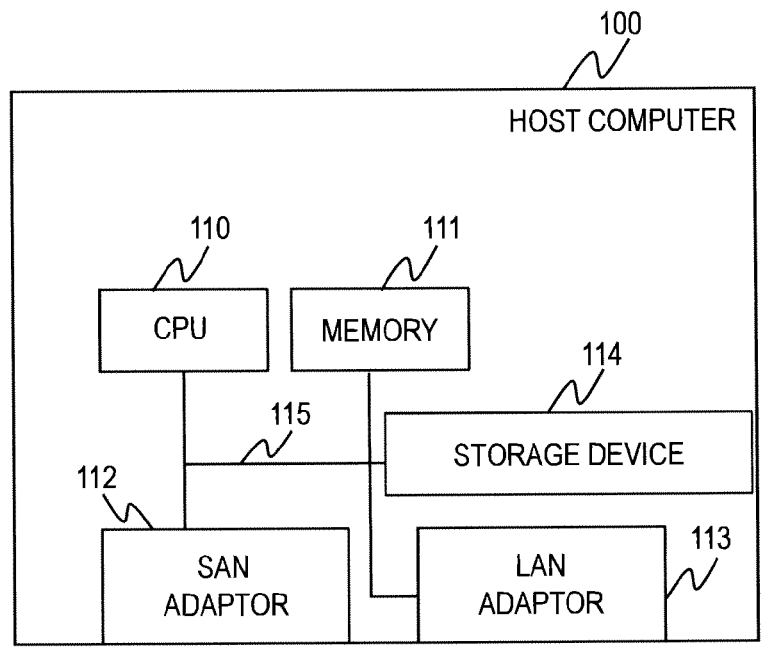
FIG. 2A is a block diagram illustrating an internal configuration of a host computer according to the first embodiment of this invention.

FIG. 2A is a block diagram illustrating an internal configuration of the host computer 100 according to the first embodiment of this invention.

The host computer 100 includes one or more central processing units (CPUs) 110, one or more memories 111, one or more SAN adaptors 112, one or more LAN adaptors 113, and one or more storage devices 114, which are mutually coupled via an internal bus 115. The host computer 100 is coupled to the storage apparatus 400 via the SAN adaptor 112. The host computer 100 is coupled to the management server 200 via the LAN adaptor 113. The host computer 100 may not always include a storage device 114. When no storage device 114 is installed, the host computer 100 uses a volume in the storage apparatus 400 as a software storage area.

Figure 2B:
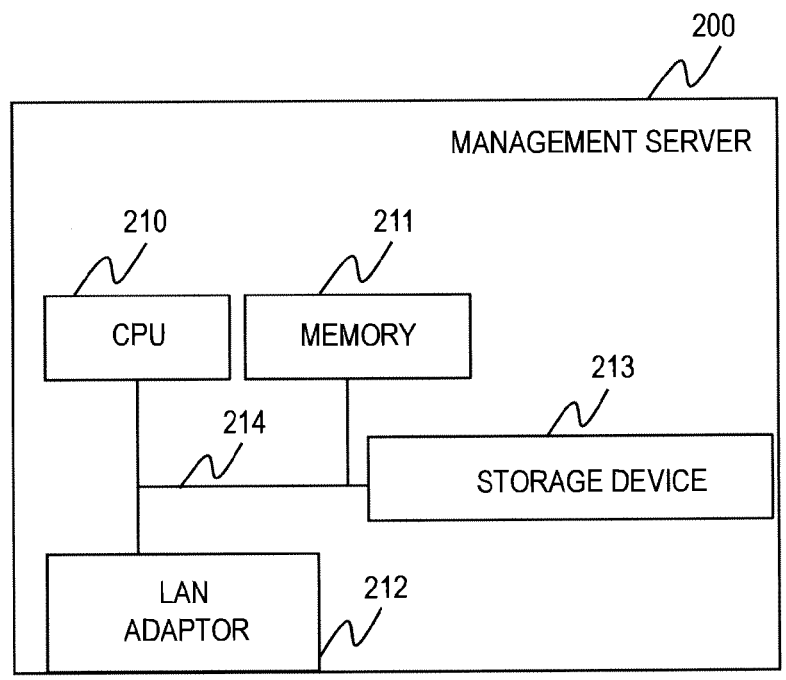
FIG. 2B is a block diagram illustrating an internal configuration of a management server according to the first embodiment of this invention.

FIG. 2B is a block diagram illustrating an internal configuration of the management server 200 according to the first embodiment of this invention.

The internal configuration of the management server 200 is similar to that of the host computer 100. However, the management server 200 may not always include a SAN adaptor. The management server 200 illustrated in FIG. 2B includes one or more CPUs 210, one or more memories 211, one or more LAN adaptors 212, and one or more storage devices 213, which are mutually coupled via an internal bus 214. The management server 200 is coupled to the storage apparatus 400 and the host computer 100 via the LAN adaptor 212.

Figure 3:
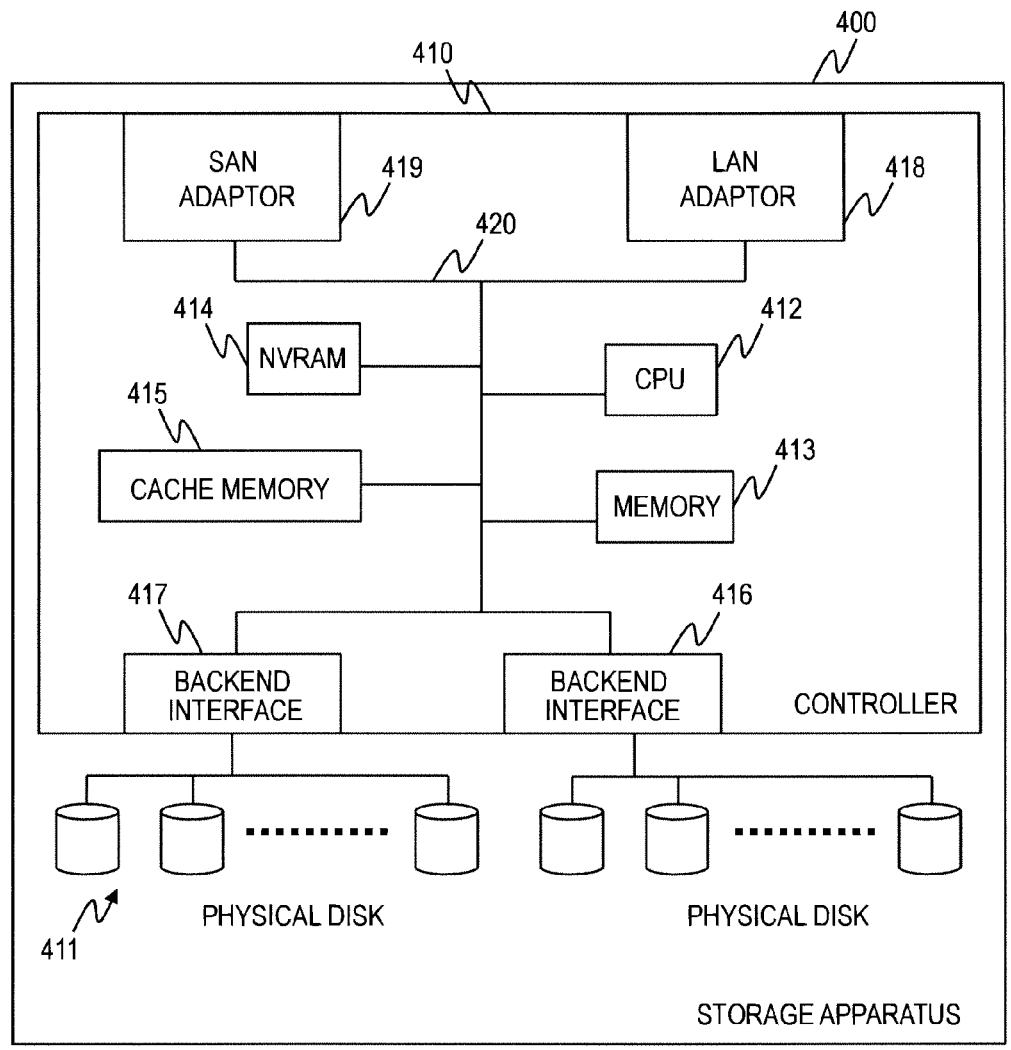
FIG. 3 is a block diagram illustrating an internal configuration of a storage apparatus according to the first embodiment of this invention.

FIG. 3 is a block diagram illustrating an internal configuration of the storage apparatus 400 according to the first embodiment of this invention.

The storage apparatus 400 includes one or more controllers 410 and one or more physical disks 411. The controller 410 includes one or more CPUs 412, one or more memories 413, one or more non volatile random access memories (NVRAMs) 414, one or more cache memories 415, one or more backend interfaces 416 and 417, one or more LAN adaptors 418, and one or more SAN adaptors 419, which are mutually coupled via an internal bus 420.

The controller 410 is coupled to the physical disks 411 via the backend interfaces 416 and 417. The storage apparatus 400 is coupled to the management server 200 via the LAN adaptor 418. The storage apparatus 400 is coupled to the host computer 100 via the SAN adaptor 419.

Figure 4:
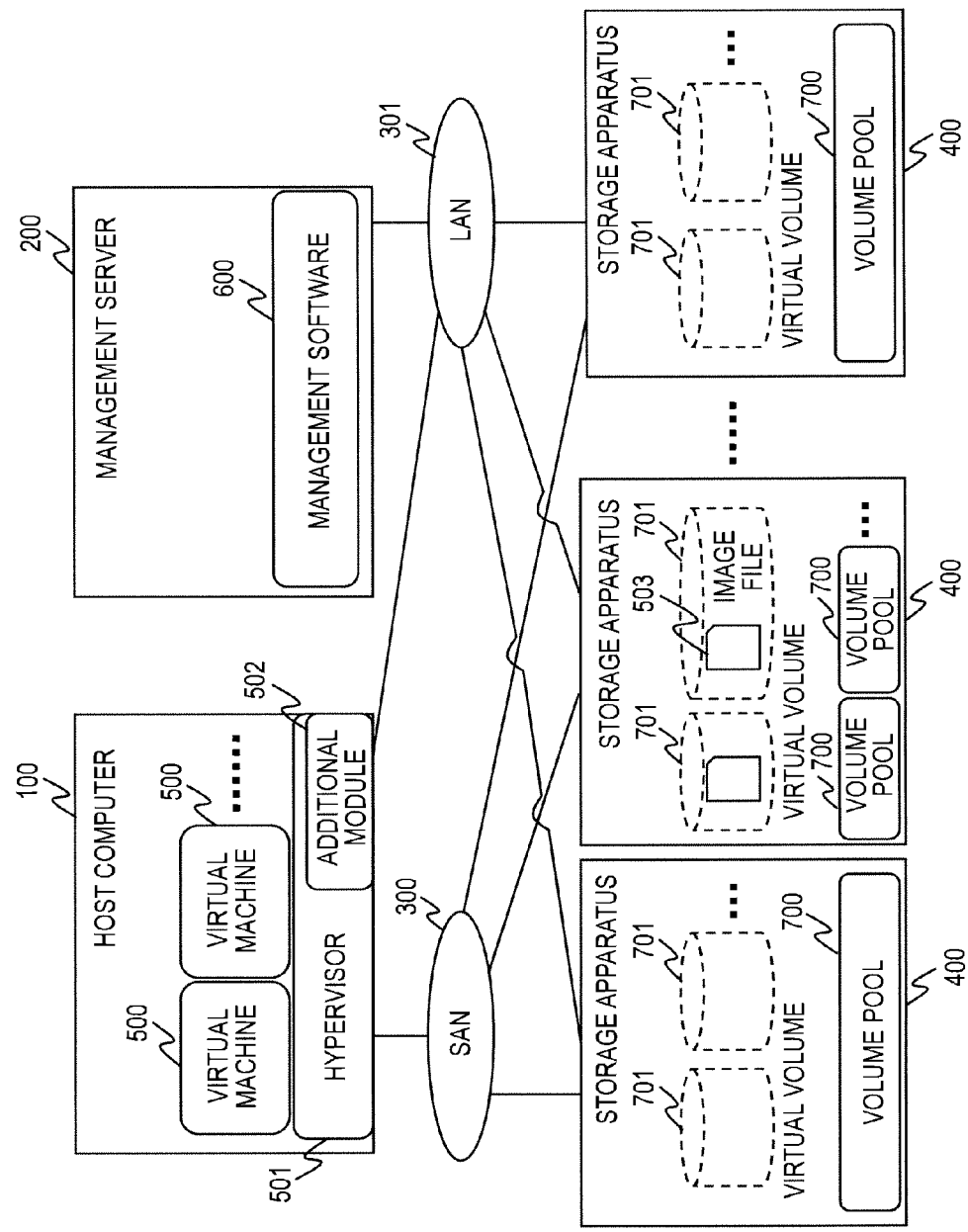
FIG. 4 is a block diagram illustrating an outline of a software configuration of the IT system according to the first embodiment of this invention.

FIG. 4 is a block diagram illustrating an outline of a software configuration of the IT system according to the first embodiment of this invention.

On the host computer 100, one or more virtual machines 500, one or more hypervisors 501, and an additional module 502 operate. The additional module is a program module added to the hypervisor 501 in this embodiment. These software programs (namely, programs corresponding to the virtual machines 500, the hypervisor 501, and the additional module 502) are stored in the storage device 114 or the storage apparatus 400 to be loaded to the memory 111 and executed by using the CPU 110.

In the description below, the virtual machine 500, the hypervisor 501, or additional module 502 may be a subject. However, the above-mentioned programs are executed by a processor (CPU 110) to perform predetermined processing by using the memory 111 and a communication port (e.g., communication control device such as the SAN adaptor 112 or the LAN adaptor 113), and hence the subject may be replaced by the processor. In the case of the host computer 100, processing executed by the virtual machine 500, the hypervisor 501, or the additional module 502 may be described as processing executed by the CPU 110 according to the above-mentioned programs. In the description below, information held by the virtual machine 500, the hypervisor 501, or the additional module 502 is actually held in the memory 111 or the storage device 114.

Processing disclosed with the processor as a subject may be described as processing executed by a computer or an information processor (host computer 100 in the case of the virtual machine 500, the hypervisor 501, or the additional module 502) that includes the processor, or a computer system that includes the computer or the information processor. Some or all of the programs may be realized by dedicated hardware.

Various programs may be installed in each computer by a nontemporary storage medium readable by a program distribution server or the computer. The same applies to the management server 200 and the storage apparatus 400, which are described below.

Management software 600 operates on the management server 200. The management software 600 is stored in the storage device 213 to be loaded to the memory 211 and executed by using the CPU 210. It should be noted that, as in the case of the host computer 100, in the description below, processing executed by the management software 600 may be described as processing executed by the CPU 210 according to the management software 600, processing executed by the management server 200, or processing executed by the computer system. In the description below, information held by the management software 600 is actually stored in the memory 211 or the storage device 213.

The management server 200 further includes an input/output device (not shown). Examples of the input/output device are a display, a keyboard, and a pointing device. However, other devices may be used. Alternatively, the management server 200 may have a serial interface or an Ethernet interface as the input/output device. A display computer (not shown) including a display, a keyboard, or a pointing device may be coupled to the interface. Then, by transmitting display information to the display computer or receiving input information from the display computer, displaying or inputting by the display computer may be received, thereby replacing inputting or displaying by the input/output device.

Hereinafter, a set of one or more computers for managing the computer system and displaying the display information according to this invention may be referred to as a management system. When the management server 200 displays the display information, the management server 200 is a management system. A combination of the management server 200 and the display computer (not shown) is also a management system. In order to achieve a higher speed and higher reliability of management processing, a plurality of computers may realize processing similar to that of the management server 200. In such a case, the plurality of computers (including display computer thereof when the display computer performs displaying) is a management system.

There are one or more volume pools 700 on the storage apparatus 400, and there are one or more virtual volumes 701 (described below) created from these volume pools. The virtual volumes 701 are allocated to the host computer 100 via the SAN 300. It should be noted that, on the storage apparatus 400, there may be mixed logical volumes in addition to the virtual volumes 701. A single hypervisor 501 may be provided for the plurality of host computers.

The hypervisor 501 provides an environment for realizing a plurality of virtual machines. The hypervisor 501 recognizes and manages volumes (namely, virtual volume 701 and logical volume 702 (refer to FIG. 5)). The hypervisor 501 manages which of the volumes stores an image file 503 of the virtual machine 500, and executes writing in the image file 503. However, during creation of a new image file, the additional module 502 that captures the new file creation of the hypervisor 501 determines a volume in which the image file is to be stored.

FIG. 19 is an explanatory diagram illustrating an example of a host volume management table 2100 held by the hypervisor 501 according to the first embodiment of this invention.

Hereinafter, information held by the computer system is expressed as a "table". However, such information may be expressed as a data structure other than the table, for example, a list, a database (DB), or a queue. To show that such information is not dependent on the data structure, for example, the "host volume management table" may be referred to as "host volume management information". To describe contents of the information, an expression such as "identification information", "identifier", "title", "name", or "ID" may be used. However, these expressions are replaceable. The same applies to tables other than the host volume management table 2100 described below.

The host volume management table 2100 includes a host volume ID column 2101, a storage ID column 2102, a storage volume ID column 2103, and a free capacity column 2104. An identifier of a volume (virtual volume or logical volume) recognized and provided by the hypervisor 501 is registered in the host volume ID column 2101. An identifier of a storage apparatus in which a storage volume (namely, volume recognized by the storage apparatus 400) corresponding to a host volume (namely, volume recognized by the host computer 100) exists is registered in the storage ID column 2102. An identifier of the storage volume corresponding to the host volume is registered in the storage volume ID column 2103. A free capacity of the host volume is registered in the free capacity column 2104.

The host volume management table 2100 may further include a column for registering information other than the above-mentioned information, such as information indicating an I/O amount to each host volume. For example, the host computer 100 may periodically measure an I/O amount to each host volume, and register the result in the host volume management table 2100.

It should be noted that the storage ID and the storage volume ID are pieces of information provided and held by the storage apparatus 400. The hypervisor 501 may acquire the information from the storage apparatus 400 by utilizing a Small Computer System Interface (SCSI) Inquiry.

The management software 600 acquires configuration information from each of the host computer 100 and the storage apparatus 400 to store the information in the management table. The management software 600 transmits priority order information of write destination volumes to the additional module 502. The management software 600 is described below in detail FIG. 5 is a block diagram illustrating an outline of a software configuration in the storage apparatus 400 according to the first embodiment of this invention.

A storage agent 703, a virtual volume manager 704, and a logical volume manager 705 operate on the storage apparatus 400. These are stored in the physical disk 411 or the NVRAM 414 to be loaded to the memory 413 and executed by using the CPU 412. As in the case of the host computer 100, hereinafter, processing executed by the storage agent 703, the virtual volume manager 704, or the logical volume manager 705 may be described as processing executed by the CPU 412 according to a program, processing executed by the storage apparatus 400, or processing executed by the computer system. Hereinafter, information held by the storage agent 703, the virtual volume manager 704, or the logical volume manager 705 is actually stored in the memory 111 or the storage device 114.

Figure 5:
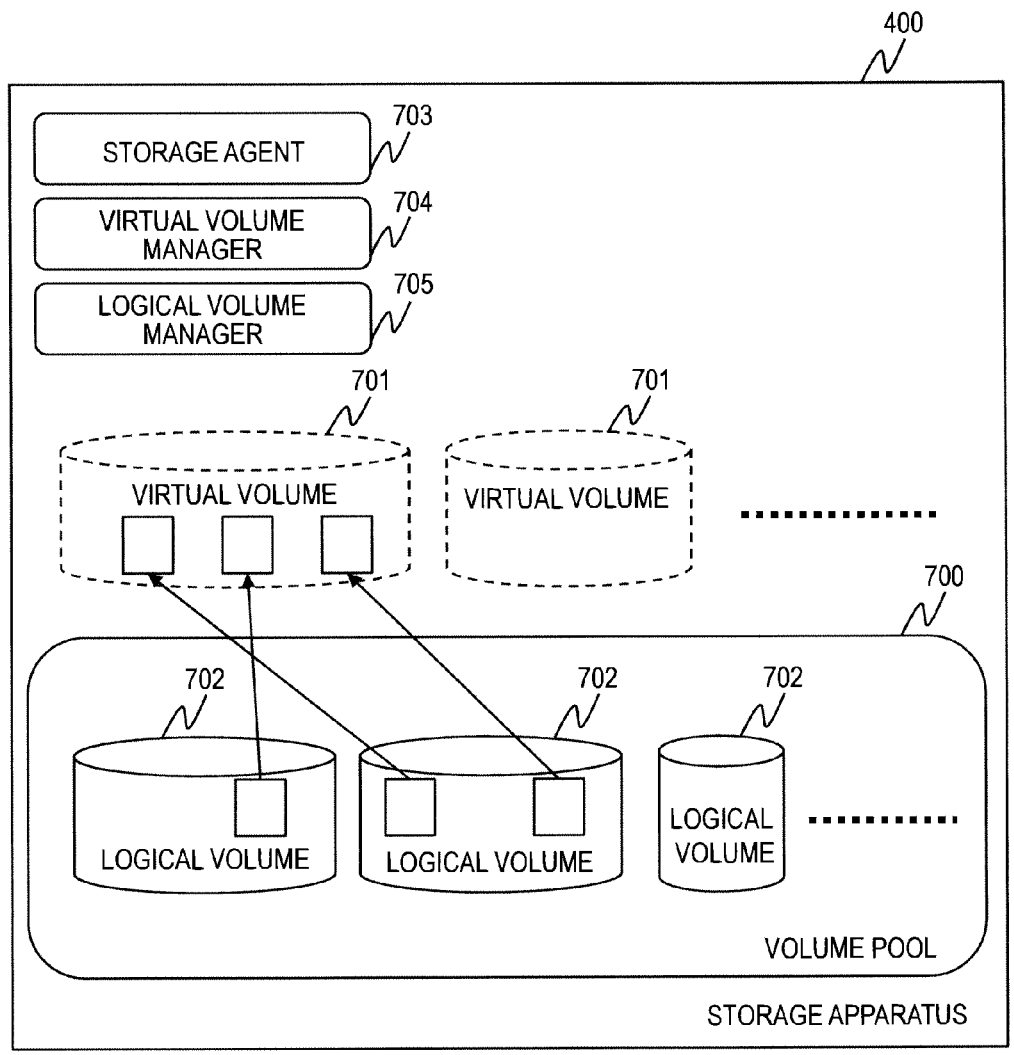
FIG. 5 is a block diagram illustrating an outline of a software configuration in the storage apparatus according to the first embodiment of this invention.

In the example illustrated in FIG. 5, the virtual volume 701 is to be allocated to the host computer 100. The logical volume 702 belonging to the volume pool 700 is used to be allocated to the virtual volume 701, and not allocated to the host computer 100 directly (i.e., not via virtual volume 701). In reality, however, the storage apparatus 400 may include a logical volume 702 not belonging to the volume pool 700. The logical volume 702 not belonging to the volume pool 700 may not be allocated to the virtual volume 701. However, the logical volume 702 may be allocated to the host computer directly and not via the virtual volume 701.

Referring to FIG. 4, the case where the virtual volume 701 and the logical volume may be mixed on the storage apparatus 400 has been described. This means that a virtual volume 701 allocatable to the host computer 100 and a logical volume 702 allocatable to the host computer 100 may be mixed, in other words, that a logical volume 702 belonging to the volume pool 700 and a logical volume 702 not belonging to the volume pool 700 may be mixed.

The logical volume manager 705 creates one or more logical volumes 702 from the physical disks 411, and manages mapping between the logical volumes 702 and the physical disks 411.

Figure 6:
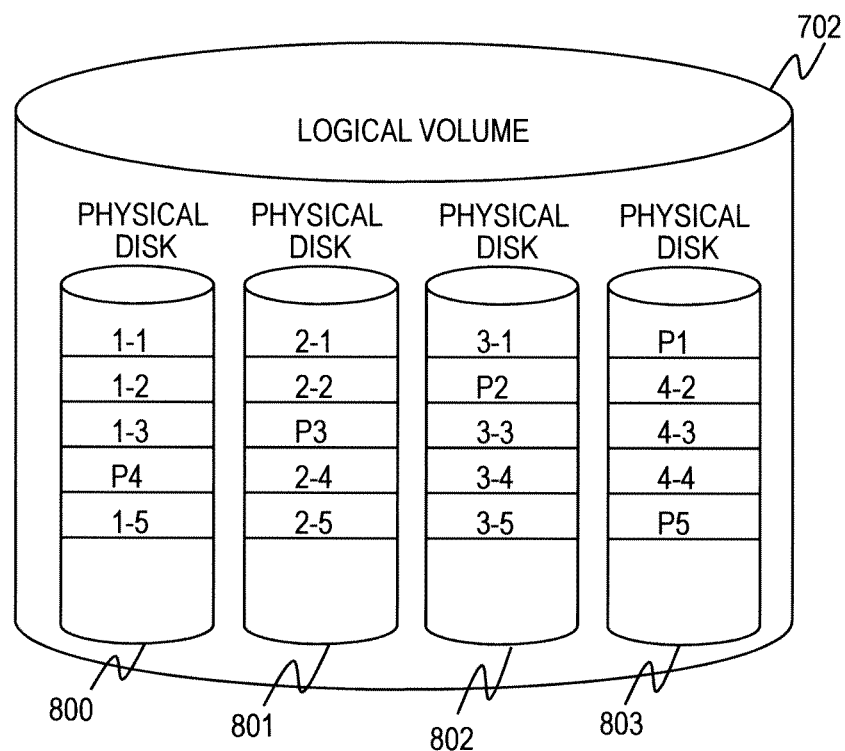
FIG. 6 is a conceptual diagram illustrating a relationship between a logical volume and a physical disk according to the first embodiment of this invention.

FIG. 6 is a conceptual diagram illustrating a relationship between the logical volume 702 and the physical disk 411 according to the first embodiment of this invention.

In the example illustrated in FIG. 6, the logical volume 702 includes four physical disks 800, 801, 802, and 803. Areas labeled 1-1, 1-2, 1-3 . . . in the physical disks are areas sectioned into predetermined sizes, and referred to as stripes. Areas labeled P1, P2, . . . are areas for storing parity information of corresponding stripes, and referred to as parity stripes. The logical volume manager 705 holds a volume management table to manage a mapping relationship between the logical volume 702 and the physical disk 411.

Figure 7:
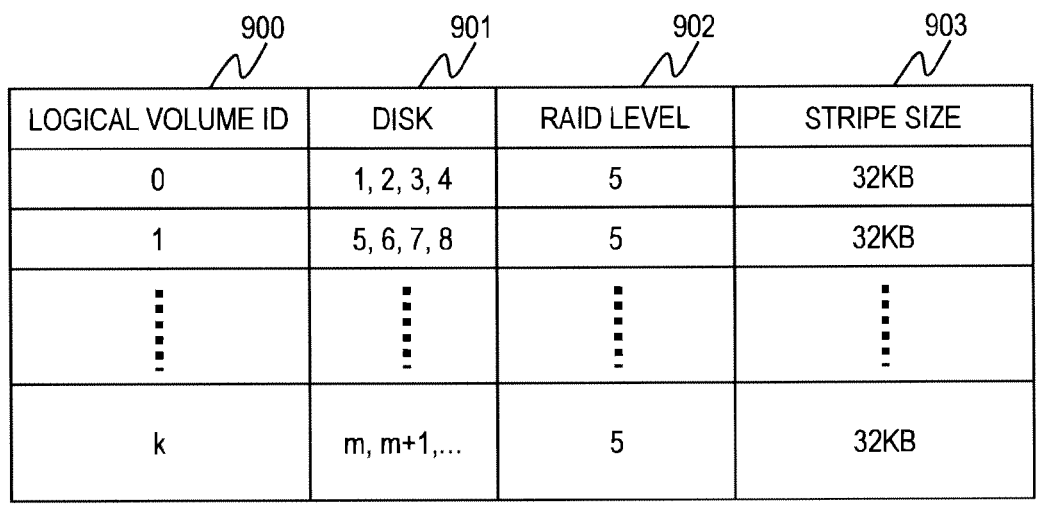
FIG. 7 is an explanatory diagram illustrating an example of a volume management table held by a logical volume manager according to the first embodiment of this invention.

FIG. 7 is an explanatory diagram illustrating an example of the volume management table held by the logical volume manager 705 according to the first embodiment of this invention.

The volume management table includes a logical volume ID column 900, a disk column 9011, a RAID level column 902, and a stripe size column 903. An identifier assigned to each logical volume by the logical volume manager 705 is registered in the logical volume ID column 900. An identifier of a physical disk constituting a logical volume is registered in the disk column 901. A redundant arrays of inexpensive disks (RAID) level used for constructing a logical volume is registered in the RAID level column 902. A size of a stripe used for constructing a logical volume is registered in the stripe size column 903.

The virtual volume manager 704 creates one or more virtual volumes 701 from the logical volumes 702 registered in the volume pool 700, and manages mapping between the virtual volumes 701 and the logical volumes 702.

Figure 8:
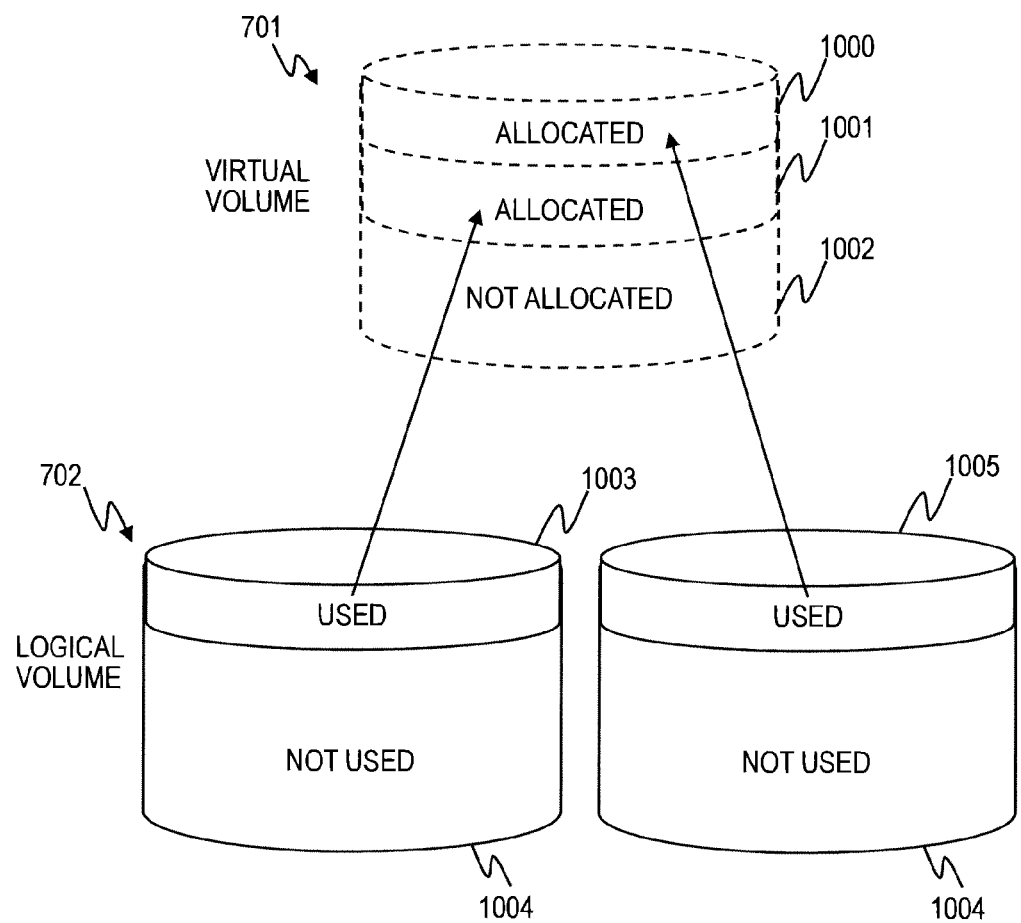
FIG. 8 is a conceptual diagram illustrating a relationship between a virtual volume and the logical volumes according to the first embodiment of this invention.

FIG. 8 is a conceptual diagram illustrating a relationship between the virtual volume 701 and the logical volumes 702 according to the first embodiment of this invention.

In many cases, a storage area (hereinafter, real storage area) of the physical disk is not directly allocated to the virtual volume 701, but as illustrated in FIG. 8, the logical volumes 702 are created, and certain areas in the logical volumes 702 are allocated. When there is data written in the virtual volume 701, the virtual volume manager 704 allocates an unused area (not yet allocated to the virtual volume 701) in the logical volume 702 to a place of the virtual volume 701 in which the data has been written.

In the example illustrated in FIG. 8, an area 1003 of the logical volume 702 is allocated to an area 1000 of the virtual volume 701, and an area 1005 of the logical volume 702 is allocated to an area 1001 of the virtual volume 701. This means that the host computer has written data in the area 1000 and the area 1001. For example, when the storage apparatus 400 receives a request of writing data in the area 1000 from the host computer 100, the data is stored in the area 1003 of the logical volume 702 allocated to the area 1000 (more accurately, real storage area in the physical disk 801 allocated to the area 1003). It should be noted that, as illustrated in FIG. 7, real storage areas in the physical disk 801 are allocated in advance to all the areas in the logical volume 702.

In the example illustrated in FIG. 8, no area of the logical volume 702 is allocated to an area 1002 excluding the area 1000 and the area 1001 in the virtual volume 701. A remaining area 1004 excluding the areas 1003 and 1005 in the logical volume 702 is not yet allocated to the virtual volume 701 (and is unused). When the storage apparatus 400 receives a new request of writing data in the area 1002, at least a part of the area 1004 is allocated to at least a data writing part of the area 1002, and the data is stored in the allocated area.

It should be noted that, as described above, in many cases (including the case of this embodiment), the certain area of the logical volume 702 is allocated to the virtual volume 701. However, the real storage area of the physical disk may be directly allocated to the virtual volume. Even when a certain area of the logical volume 702 is allocated as described above, eventually, as a result of the allocation, the real storage areas of the physical disk correspond to the areas 1000 and 1001 of the virtual volume 701.

In order to manage a relationship between the virtual volumes 701 and the logical volumes 702, an allocation status of the virtual volume 701, and a use status in the logical volume 702, the virtual volume manager 704 holds the virtual volume management table 1100 and an unused area management table 1200.

FIG. 9 is an explanatory diagram illustrating an example of the virtual volume management table 1100 held by the virtual volume manager 704 according to the first embodiment of this invention.

The virtual volume management table 1100 largely includes a virtual volume column indicating a position in the virtual volume and a logical volume column indicating a corresponding area in the logical volume.

The virtual volume column includes a volume ID column 1101, a start logical block address (LBA) column 1102, and an end LBA column 1103. An identifier of a volume allocated to the virtual volume is registered in the volume ID column 1101. A start LBA of an area in the virtual volume is registered in the start LBA column 1102. An end LBA of an area in the virtual volume is registered in the end LBA column 1103.

The logical volume column similarly includes a volume ID column 1104, a start LBA column 1105, and an end LBA column 1106. An identifier of a logical volume having a data storage area allocated to a corresponding area of the virtual volume is registered in the volume ID column 1104. A start LBA of an area in the logical volume is registered in the start LBA column 1105. An end LBA of an area in the logical volume is registered in the end LBA column 1106.

For example, in FIG. 9, "3", "0x00000000", and "0x0001af0f" are respectively registered in the volume ID column 1101, the start LBA column 1102, and the end LBA column 1103 at a head row of the virtual volume management table 1100, and "0", "0x00000000", and "0x0001af0f" are respectively registered in the volume ID column 1104, the start LBA column 1105, and the end LBA column 1106. This indicates that an area from the LBA "0x00000000" to "0x0001af0f" of the logical volume 702 identified by the volume ID "0" is allocated to an area from the LBA "0x00000000" to "0x0001af0f" of the virtual volume 701 identified by the volume ID "3". The real storage areas of the physical disk 411 are allocated in advance to the areas in the logical volume (refer to FIGS. 6 and 7), and consequently, based on the virtual volume management table 1100, the real storage area of the physical disk 411 allocated to the area in the virtual volume 701 may be specified.

FIG. 10 is an explanatory diagram illustrating an example of the unused area management table 1200 held by the virtual volume manager 704 according to the first embodiment of this invention.

The unused area management table 1200 includes a logical volume ID column 1201, a start LBA column 1202, and an end LBA column 1203. An identifier of the logical volume 702 registered in the volume pool 700 for allocating a data storage area to the virtual volume 701 is registered in the logical volume ID column 1201. A start LBA and an end LBA column of the unused area 1004 in the logical volume 702 are respectively registered in the start LBA column 1202 and the end LBA column 1203.

The storage agent 703 manages the logical volumes 702 and the virtual volumes 701.

FIG. 20 is an explanatory diagram illustrating an example of a storage volume management table 2200 held by the storage agent 703 according to the first embodiment of this invention.

The storage volume management table 2200 includes a storage volume ID column 2201, a pool ID column 2202, and a pool free capacity column 2203. An identifier of a storage volume (namely, virtual volume 701 or logical volume 702) is registered in the storage volume ID column 2201. An identifier of a volume pool corresponding to a volume (hereinafter, the volume of interest in the description made referring to FIG. 20) identified by the identifier registered in the storage volume ID column 2201 is registered in the pool ID column 2202. A free capacity of a volume pool corresponding to the volume of interest is registered in the pool free capacity column 2203. The free capacity of the volume pool is a capacity of an area not yet allocated to the virtual volume 701 in the volume pool 700.

When the volume of interest is the logical volume 702, the volume pool 700 does not correspond to the volume of interest. Therefore, a blank is registered in the pool ID column 2202, and a maximum value registerable in the pool free capacity column 2203 is registered in the pool free capacity column 2203 irrespective of an actual capacity and a free capacity of the volume of interest. A reason for registering such a value is described below (refer to FIG. 15).

However, information regarding the logical volume 702 may be registered in the storage volume management table 2200 in a format other than the above-mentioned format. For example, a column indicating which of the logical volume 702 and the virtual volume 701 the volume of interest is may be registered in the storage volume management table 2200, and the pool ID column 2202 and the pool free capacity column 2203 may be blanks when the volume of interest is the logical volume 702.

The storage volume management table 2200 may include other columns in addition to the above-mentioned columns. For example, the storage volume management table 2200 may further include a column for registering an I/O amount to each storage volume or an I/O amount to each volume pool. For example, the storage apparatus 400 may periodically measure an I/O amount to each storage volume or each volume pool, and register the result in the storage volume management table 2200.

FIG. 11 is an explanatory diagram illustrating an example of a host storage volume management table 1600 held by the management software 600 according to the first embodiment of this invention.

The host storage volume management table 1600 largely includes a host side information column and a storage side information column.

The host side information column includes a host volume ID column 1601 and a free capacity column 1602. An identifier of a volume recognized by the hypervisor 501 is registered in the host volume ID column 1601. Hereinafter, in the description made referring to FIG. 11, a volume identified by the identifier registered in the host volume ID column 1601 is referred to as the volume of interest. The volume of interest is the virtual volume 701 or the logical volume 702 allocated to the host computer. A free capacity of the volume of interest is registered in the free capacity column 1602.

The storage side information column includes a storage ID column 1603, a storage volume ID column 1604, a pool ID column 1605, and a pool free capacity column 1606. Identifiers of a storage apparatus and a storage volume (in other words, identifier of the storage apparatus 400 for storing the volume of interest, and identifier assigned to the volume of interest by the storage apparatus 400) corresponding to the host volume ID column 1601 are respectively registered in the storage ID column 1603 and the storage volume ID column 1604. An identifier of a volume pool corresponding to the volume of interest is registered in the pool ID column 1605. A free capacity of the volume pool 700 corresponding to the volume is registered in the pool free capacity column 1606.

It should be noted that an identifier of the host volume ID column 1601 and an identifier of the storage volume ID column 1604 are generally different from each other. When the volume of interest is a logical volume, as in the case illustrated in FIG. 20, the pool ID column 1605 is a blank, and a value of the pool free capacity column 1606 is a registerable maximum value.

The host side information column and the storage side information column may include other columns than the above-mentioned columns. For example, when the host volume management table 2100 includes a column for registering an I/O amount to each host volume, the host side information column of the host storage volume management table 1600 may include a similar column as well. When the storage volume management table 2200 includes a column for registering an I/O amount to each storage volume or each volume pool, the storage side information column of the host storage volume management table 1600 may include a similar column as well.

It should be noted that the host storage volume management table 1600 may be created from the "host volume management table 2100" and a "table obtained by assigning an identifier (storage ID) of each storage apparatus 400 to the storage volume management table 2200". Specifically, each row of the host storage volume management table 1600 is created by comparing a "row of the host volume management table 2100" with a "row of the table obtained by assigning the identifier (storage ID) of each storage apparatus 400 to the storage volume management table 2200", and coupling the rows having identical storage ID and storage volume ID. However, a volume not registered in the host volume management table 2100 (namely, volume not recognized by the host computer 100) is not registered in the host storage volume management table 1600.

Figure 12:
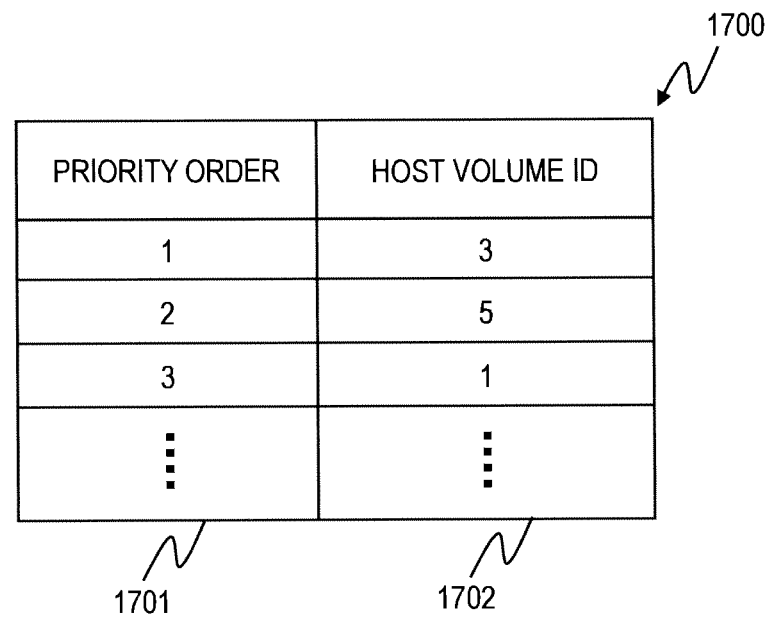

FIG. 12 is an explanatory diagram illustrating an example of a write destination candidate volume management table 1700 held by the additional module 502 according to the first embodiment of this invention.

The write destination candidate volume management table 1700 includes a priority order column 1701 and a host volume ID column 1702. An order for retrieving a write destination volume during file creation of the additional module 502 is registered in the priority order column 1701. An identifier of a volume recognized by the hypervisor 501 is registered in the host volume ID column 1702.

It should be noted that the order registered in the write destination candidate volume management table 1700 is an index indicating desirability of each volume as a storage destination of the image file 503. As a priority order of a volume is higher, the volume is more desirable as a storage destination of the image file 503. However, as described below, a storage destination is not always selected according to the priority order. The priority order may be referred to only to issue an alert.

Figure 13:
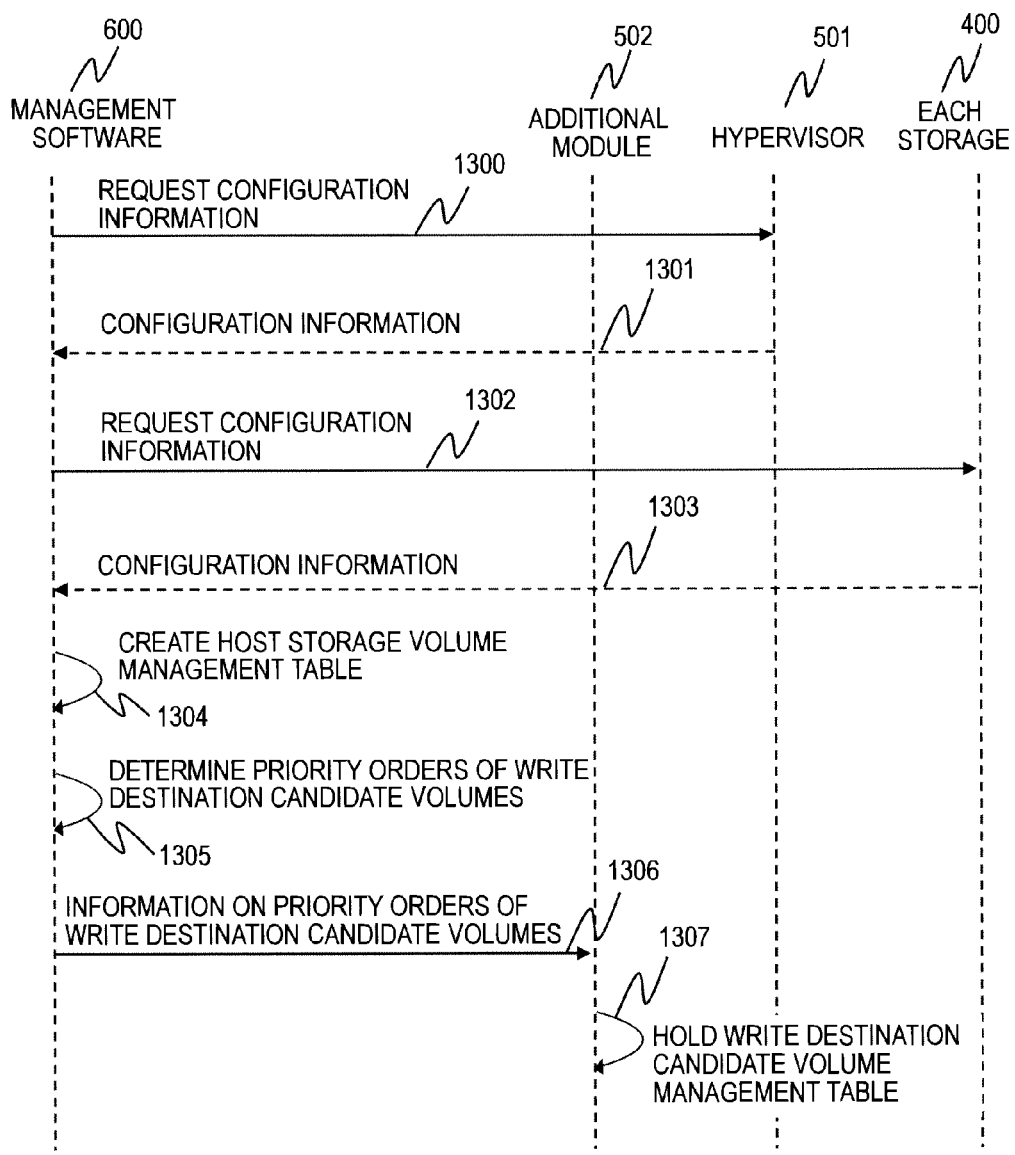
FIG. 13 is a sequential diagram illustrating processing from acquisition of pieces of configuration information of a hypervisor and each storage apparatus by the management software to holding of the write destination candidate volume management table by the additional module according to the first embodiment of this invention.

FIG. 13 is a sequential diagram illustrating processing from acquisition of pieces of configuration information of the hypervisor 501 and each storage apparatus 400 by the management software 600 to holding of the write destination candidate volume management table 1700 by the additional module 502 according to the first embodiment of this invention.

It should be noted that this processing is periodically executed to update the write destination candidate volume management table 1700. However, in addition to the periodical execution, the processing illustrated in FIG. 13 may be executed at optional timing or in response to a predetermined event, for example, when a user instructs execution or at the time of information pushing from the hypervisor 501 or the storage apparatus 401.

First, the management software 600 requests the hypervisor 501 to transmit host side configuration information (Step 1300).

Then, the management software 600 receives the host side configuration information from the hypervisor 501 (Step 1301). The configuration information to be acquired is an information item included in the host volume management table 2100. It should be noted that the acquired configuration information may contain other information than the above-mentioned information. The host side configuration information may be transmitted from the hypervisor 501 without any request from the management software 600.

Then, the management software 600 requests each storage apparatus 400 to transmit storage side configuration information (Step 1302).

Then, the management software 600 receives the storage side configuration information from each storage apparatus 400 (Step 1303). The configuration information to be acquired is the identifier (storage ID) of each storage apparatus 400 and an information item included in the storage volume management table 2200. It should be noted that the acquired configuration information may contain other information than the above-mentioned information. The storage side configuration information may be transmitted from each storage apparatus 400 without any request from the management software 600.

Then, the management software 600 creates the host storage volume management table 1600 based on the information acquired in Step 1301 and the information acquired in Step 1303 (Step 1304). A creation method is as described above referring to FIG. 11.

Then, the management software 600 determines priority orders of write destination candidate volumes by processing described below (Step 1305).

Then, the management software 600 transmits information on the priority orders of the write destination candidate volumes to the additional module 502 (Step 1306).

The additional module 502 holds the write destination candidate volume management table 1700 based on the information on the priority orders of the write destination candidate volumes received from the management software 600 (Step 1307).

Figure 14:
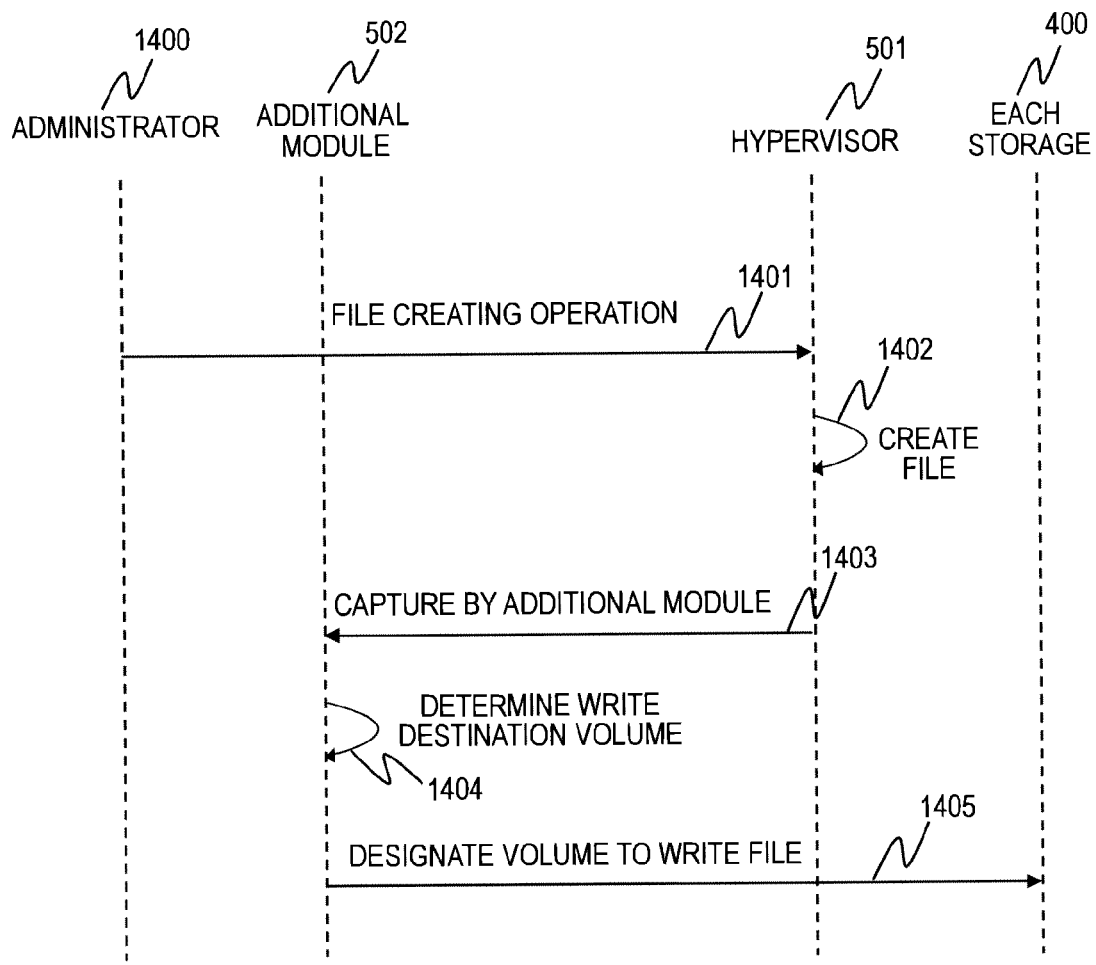
FIG. 14 is a sequential diagram illustrating processing from an operation involving file creation on the hypervisor by an administrator to writing of a file in a designated volume of each storage apparatus by the additional module according to the first embodiment of this invention.

FIG. 14 is a sequential diagram illustrating processing from an operation involving file creation on the hypervisor 501 by the administrator 1400 to writing of a file in a designated volume of each storage apparatus 400 by the additional module 502 according to the first embodiment of this invention.

It should be noted that the operation involving the file creation is an operation involving an instruction to create a new image file 503 such as "creation of new virtual machine 500" or "addition of new disk image to virtual machine 500". Alternatively, the operation may be another operation involving an instruction to create a new image file 503. Before the processing illustrated in FIG. 14, the processing illustrated in FIG. 13 must be executed to create the write destination candidate volume management table 1700.

First, the administrator 1400 performs an operation involving file creation on the hypervisor 501 (Step 1401).

Then, the hypervisor 501 executes file creation according to the operation in Step 1401 (Step 1402).

Then, the additional module 502 captures the file creation of the hypervisor 501 (Step 1403). It should be noted that, as an example of a method of realizing capturing, there is a method for receiving, by the additional module 502, an occurrence notification of a file creation event from the hypervisor 501.

Then, the additional module 502 determines a write destination volume by using the write destination candidate volume management table 1700 (Step 1404). Basically, the additional module 502 selects a volume of a highest priority order as a write destination volume, and in Step 1405 subsequent thereto, sequentially selects volumes of lower priority orders when writing fails due to an I/O error or a capacity shortage.

Then, the additional module 502 writes the file in the volume determined in Step 1404 (Step 1405).

It should be noted that, in Step 1405, the additional module 502 may write the file not in the volume determined in Step 1404 but in a volume designated by the hypervisor 501 (irrespective of priority orders). In this case, when the volume designated by the hypervisor 501 is a volume having a low priority order in the write destination candidate volume management table 1700, the hypervisor 501 or the management software 600 displays an alert to the administrator 1400. Whether a priority order is low may be determined based on a predetermined threshold value. For example, a priority order equal to or less than upper 10 percent orders, a priority order equal to or less than a 10th order, or a priority order less than an order defined by the administrator 1400 may be determined to be a low priority order.

Figure 15:
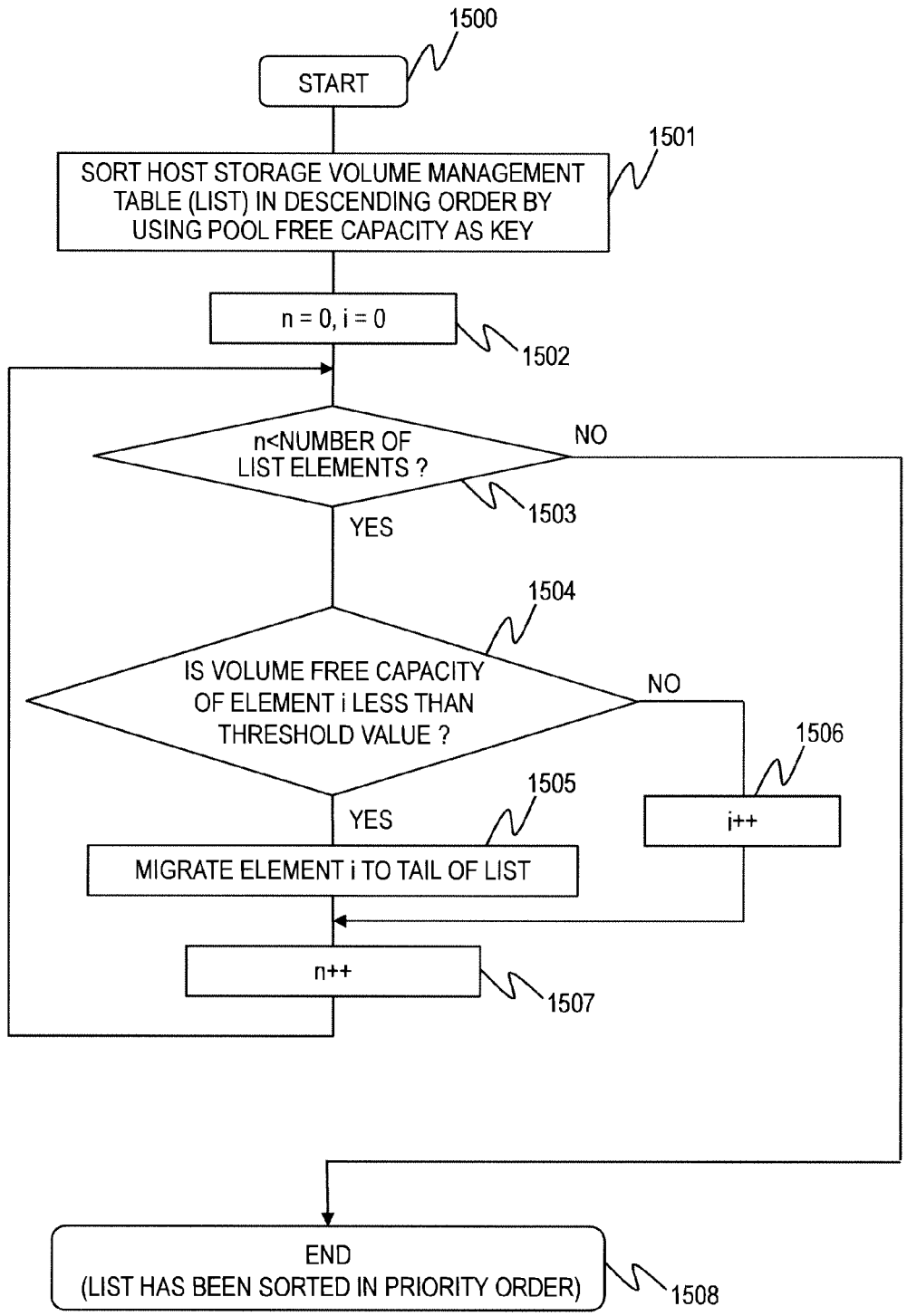
FIG. 15 is a flowchart illustrating an example of determination of priority order in the write destination candidate volume management table, which is executed according to the first embodiment of this invention.

FIG. 15 is a flowchart illustrating an example of determination of priority order (Step 1305) in the write destination candidate volume management table 1700, which is executed according to the first embodiment of this invention.

First, the management software 600 sorts the host storage volume management table 1600 in descending order of the pool free capacity column 1606 (Step 1501). A reason is as follows. After storage of the image file 503, data is written in the image file 503. When this data writing results in a shortage of a capacity of the volume pool 700 allocated to the storage destination virtual volume 701, the data must be copied between the volume pools 700 to eliminate the shortage, causing a reduction in I/O performance. In order to reduce the number of such data copies, it is desired to store the image file 503 in the virtual volume 701 allocated to the volume pool 700 having a large free capacity.

It should be noted that, when there is registered an I/O amount to the volume pool in the host storage volume management table 1600, the host storage volume management table 1600 may be sorted in ascending order of the I/O amount. A reason is that in order to prevent a performance reduction caused by concentration of I/O in a specific physical disk, it is desired to store the image file 503 in the virtual volume 701 allocated to the volume pool 700 having a small I/O amount.

Then, the management software 600 initializes variables n and i by 0 (Step 1502). The variable n is used for repetitive processing from Step 1503 to Step 1507, and indicates how many times the processing is repeated. The variable i is used in the repetitive processing from Step 1503 to Step 1507, and indicates what row of the host storage volume management table 1600 is processed.

When the variable n is smaller than the number of rows registered in the host storage volume management table 1600, the management software 600 executes the repetitive processing from Step 1503 to Step 1507 (Step 1503). In other cases, processing has been completed for all the rows, and hence the processing proceeds to Step 1508.

When it is determined in Step 1503 that the variable n is smaller than the number of rows registered in the host storage volume management table 1600, the management software 600 determines whether an i-th row of the host storage volume management table 1600 satisfies predetermined conditions (Step 1504).

The predetermined conditions are for volumes not desirable as storage destinations of the image file 503. For example, it is generally undesirable to store a new image file 503 in a volume short of capacity. In order to secure performance of the virtual machine 500, it is undesirable to store a new image file 503 in the virtual volume 701 corresponding to the volume pool 700 having congested I/O. Thus, the conditions in Step 1504 may be, for example, any one of the conditions that "free capacity of the volume registered in the i-th row is less than a threshold value", and that "I/O amount to the volume pool corresponding to the volume registered in the i-th row is equal to or more than a threshold value", or a combination of the two.

The management software 600 executes Step 1505 when the conditions are satisfied, and Step 1506 when the conditions are not satisfied.

In Step 1505, the management software 600 migrates the i-th row of the host storage volume management table 1600 to a last row. After this processing, an (i+1)th row has been shifted to the i-th row, and hence there is no need to increment i in Step 1506, and the processing only needs to proceed to Step 1507.

In Step 1506, the management software 600 increments i to migrate a processing target to a next row of the host storage volume management table 1600.

The management software 600 increments, after execution of Step 1505 or 1506, n to perform repetitive processing (Step 1507), and proceeds to Step 1503.

When it is determined in Step 1503 that the variable n is equal to or more than the number of rows of the host storage volume management table 1600, the management software 600 ends the priority order determination (Step 1508). At this stage, the rows of the host storage volume management table 1600 have been sorted in descending order of priority. In other words, a priority order of a volume registered in a head row is highest, and a priority order of a volume registered in a tail row is lowest.

Referring to the host storage volume management table 1600 illustrated in FIG. 11, a specific example of the priority order determination illustrated in FIG. 15 is described. It should be noted that, for simplicity, for example, a host volume identified by a value "1" of the host volume ID column 1601 is referred to as "host volume 1", a storage apparatus 400 identified by a value "storage 1" of the storage ID column 1603 is referred to as "storage apparatus 1", a storage volume identified by a value "Vol 1" of the storage volume ID column 1604 is referred to as "storage volume 1", and a volume pool 700 identified by a value "pool 1" of the pool ID column 1605 is referred to as "volume pool 1". The same applies to other ID values.

In Step 1501, the rows of the host storage volume management table 1600 are sorted in order of values of the pool free capacity column 1606. Values of the pool free capacity column 1606 of the host volumes 1, 2, 3, 4, and 5 are respectively 300 gigabytes, 175 gigabytes, 1024 gigabytes, 105 gigabytes, and MAX (namely, registerable maximum value), and hence the rows are arrayed in order of the host volumes 5, 3, 1, 2, and 4 as a result of the sorting.

Then, determination of Step 1504 is performed for each of the reordered rows. For example, in Step 1504, when a value "20 gigabytes" is used as a threshold value of a free capacity of a volume, a free capacity of the host volume 1 is "10 gigabytes", which is smaller than the threshold value, and hence the row of the host volume 1 is migrated to a tail end of the host storage volume management table 1600 (Step 1505). As a result, when the processing illustrated in FIG. 15 is ended, the rows of the host storage volume management table 1600 are arrayed in order of the host volumes 5, 3, 2, 4, and 1.

In this case, priority orders of the host volumes 5, 3, 2, 4, and 1 are respectively 1, 2, 3, 4, and 5, and the values thereof are registered in the write destination candidate volume management table 1700. In other words, when the host volume 5 is selected as a write destination of the image file 503 but writing thereto fails, the host volume 3 next highest in order is selected. When writing fails again, a host volume is similarly selected according to order.

As described above, the rows are sorted in order of the free capacities of the volume pools 700 in Step 1501, and hence a virtual volume corresponding to the volume pool 700 having a larger free capacity is preferentially selected as a storage destination of the image file 503.

It should be noted that, according to this embodiment, as the pool free capacity column 1606 of the logical volume 702 allocatable to the host computer 100, a maximum value registerable in the item is registered. In the example illustrated in FIG. 11, the host volume 5 (namely, storage volume 3 of the storage apparatus 2) corresponds to such a logical volume 702. Thus, when the storage apparatus 400 includes a mixture of a virtual volume 701 and a logical volume 702 allocatable to the host computer 100, as a result of the sorting in Step 1501, a priority order of the logical volume 702 is always higher than that of the virtual volume 701. Generally, this is because I/O in the logical volume 702 is processed faster than that in the virtual volume 701, thus securing performance of the virtual machine 500 and the storage apparatus 401 by preferentially selecting the logical volume 702 when the logical volume and the virtual volume are mixed. A reason is as follows. To execute I/O in the virtual volume 701, allocation must be executed when necessary referring to mapping of the virtual volume 701 and the logical volume 702 in the volume pool 700. However, when executing I/O in the logical volume 702 directly allocated to the host computer 100, such reference and allocation are unnecessary.

In Steps 1504 and 1505, a priority order of a volume undesirable as a storage destination of the image file 503 (e.g., volume having a small free capacity or volume having congested I/O) is lowered. Hence, such a volume is unlikely to be selected as a storage destination of the image file 503.

As described above, according to this embodiment, unevenness in resource usage between the volume pools may be prevented. As a result, the number of data copies may be reduced between the pools on the storage side.

Second Embodiment

Referring to FIGS. 1 to 12, FIGS. 15 to 17, and FIGS. 19 to 21, a second embodiment of this invention is described. This embodiment is different from the first embodiment, from the standpoint of an administrator 1400, in a software module where the administrator 1400 performs an operation involving file creation. In the first embodiment, the administrator 1400 executes the operation involving the file creation on a hypervisor 501. In this embodiment, however, the administrator 1400 executes the operation involving the file creation on a management software 600. Operations of the management software 600, the hypervisor 501, and an additional module 502 of this embodiment are accordingly different from those of the first embodiment.

A system configuration according to this embodiment is similar to that of the first embodiment described above referring to FIGS. 1 to 5. A role of each software module is, except for the management software 600, the hypervisor 501, and the additional module 502, similar to that of the first embodiment. The conceptual diagrams and the management tables of the first embodiment illustrated in FIGS. 6 to 12 apply to this embodiment as well. The management software 600 according to this embodiment executes, as in the first embodiment, priority order determination in the write destination candidate volume management table 1700, which is illustrated in FIG. 15. Differences of roles of the management software 600, the hypervisor 501, and the additional module 502 of this embodiment from those of the first embodiment are described below.

Figure 16:
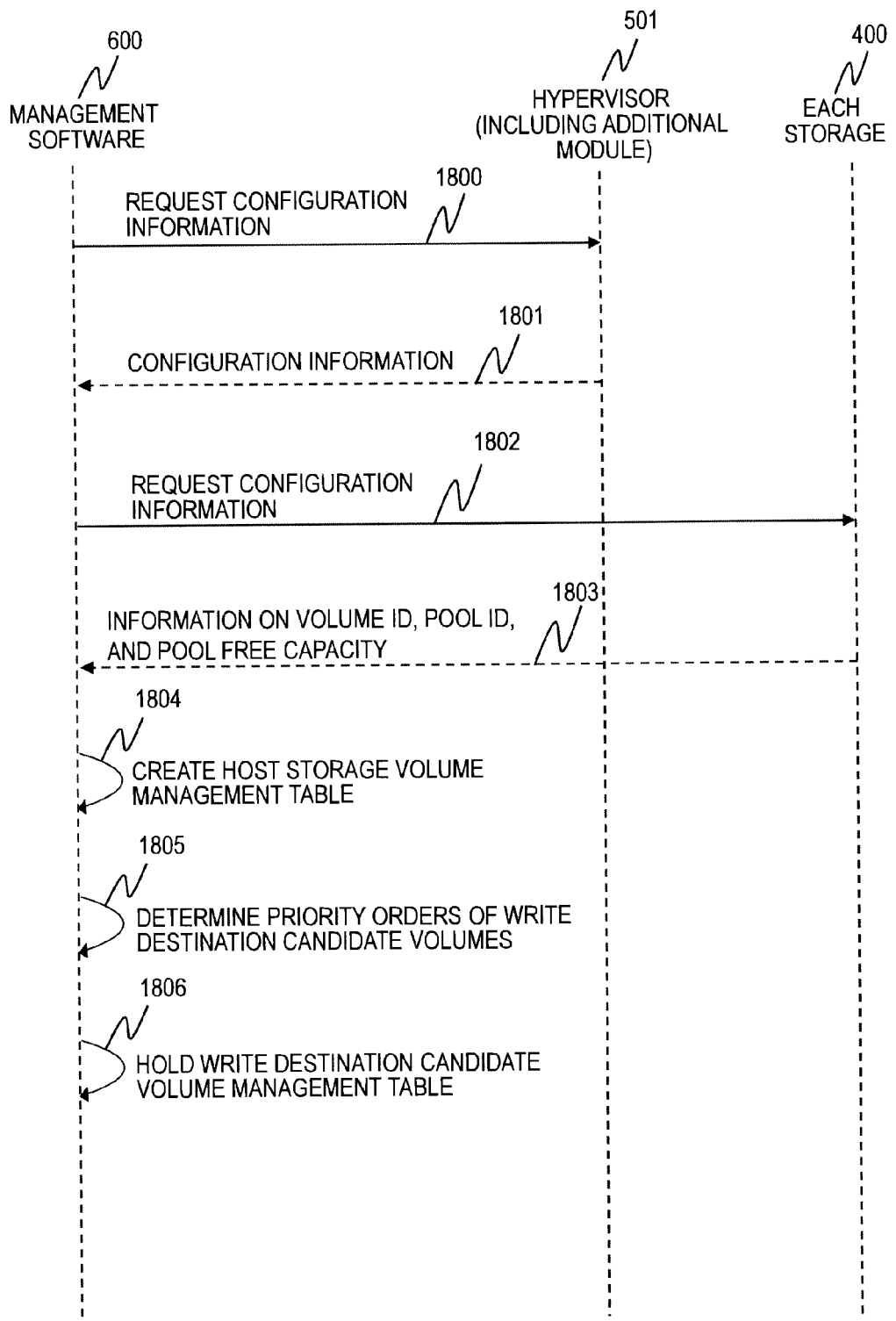
FIG. 16 is a sequential diagram illustrating processing from acquisition of pieces of configuration information of a hypervisor and each storage apparatus by a management software to holding of a write destination candidate volume management table by the management software according to a second embodiment of this invention.

FIG. 16 is a sequential diagram illustrating processing from acquisition of pieces of configuration information of the hypervisor 501 and each storage apparatus 400 by the management software 600 to holding of the write destination candidate volume management table 1700 by the management software 600 according to the second embodiment of this invention.

Processing from Step 1800 to Step 1805 is similar to that from Step 1300 to Step 1305 of the first embodiment, and thus description thereof is omitted.

According to this embodiment, in Step 1806, the management software 600 holds the write destination candidate volume management table 1700. This processing is repeatedly executed when necessary to update the write destination candidate volume management table 1700. It should be noted that, in this embodiment, the additional module 502 operates as an interface on the hypervisor 501, and executes no independent processing.

Figure 17:
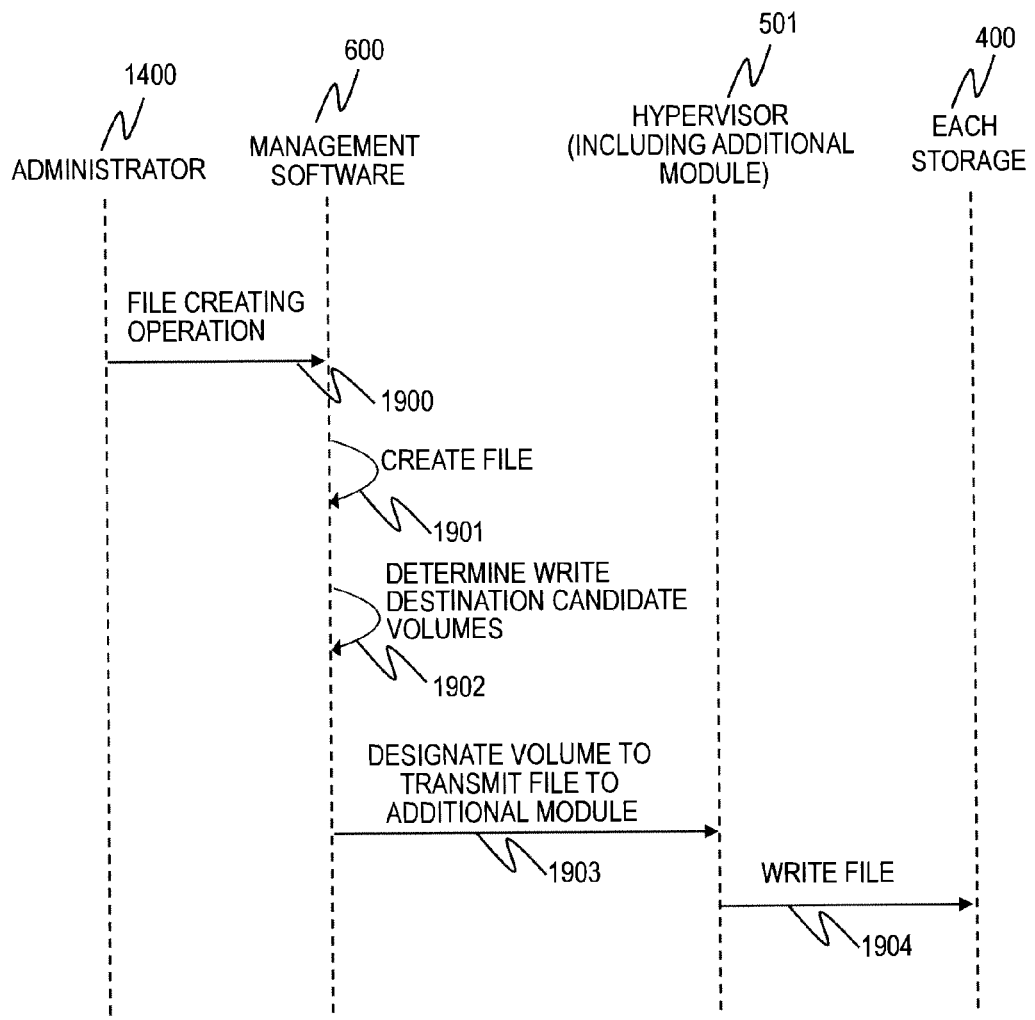
FIG. 17 is a sequential diagram illustrating processing from a file creation operation performed by the administrator on the management software to writing of a file in a designated volume of each storage apparatus by the management software via an interface according to the second embodiment of this invention.

FIG. 17 is a sequential diagram illustrating processing from a file creation operation performed by the administrator 1400 on the management software 600 to writing of a file in a designated volume of each storage apparatus 400 by the management software 600 via the interface (additional module 502) according to the second embodiment of this invention.

It should be noted that, before this processing, the management software 600 or the like must perform the processing illustrated in FIG. 16 to create the write destination candidate volume management table 1700.

First, the administrator 1400 performs a file creation operation on the management software 600 (Step 1900). It should be noted that the file creation operation is, as described above in the first embodiment, an operation involving creation of a new image file 503 such as "creation of new virtual machine 500" or "addition of new disk image to virtual machine 500". However, the file creation operation of this embodiment is performed not on the hypervisor 501 but on the management software 600.

Then, the management software 600 executes file creation, and holds the image file 503 in a memory 211 or a storage device 213 on a management server 200 (Step 1901).

Then, the management software 600 determines a write destination volume by using the write destination candidate volume management table 1700 (Step 1902). The management software 600 basically selects a volume of a highest priority order, and sequentially selects volumes of lower orders when writing fails due to an I/O error or a capacity shortage.

Then, the management software 600 designates the volume determined in Step 1902, and transmits a file to the hypervisor 501 via the additional module 502 that is an interface on the hypervisor 501 (Step 1903). It should be noted that the management software 600 may transmit the file without designating any volume. In this case, additional processing described in Step 1904 is performed.

Then, the hypervisor 501 writes the file received in Step 1903 in the designated volume (Step 1904). According to this embodiment, the additional module 502 is an interface for writing, when receiving a file to be written and designation of a write destination volume of the file, the file in the designated volume.

It should be noted that, when the file is transmitted without designating any volume in Step 1903, the hypervisor 501 writes the file in any one of the volumes irrespective of priority orders. Hereinafter, additional processing when the file is transmitted without designating any volume in Step 1903 is described.

The management software 600 requests host side configuration information from the hypervisor 501, and acquires a host volume management table 2106 including an image file column 2105 illustrated in FIG. 21.

FIG. 21 is an explanatory diagram illustrating an example of the host volume management table 2106 held by the hypervisor 501 according to the second embodiment of this invention.

Columns from a host volume ID column 2101 to a free capacity column 2104 of the host volume management table 2106 are similar to those corresponding to the host volume management table 2100 (FIG. 19), and thus description thereof is omitted. A file name of the image file 503 stored in the host volume is registered in the image file column 2105 of the host volume management table 2106.

The management software 600 searches the image file column 2105 to specify a volume for which the file has been created in Step 1904. When the specified volume is low in priority order in the write destination candidate volume management table 1700, the management software 600 issues an alert to the administrator 1400. It should be noted that determination whether a priority order is low may be executed as in the first embodiment. For example, a priority order equal to or less than upper 10 percent orders, a priority order equal to or a priority order less than a 10th order, or a priority order less than an order defined by the administrator 1400 may be determined to be a low priority order. The case of transmitting the file without designating any volume in Step 1903 has been described above.

According to the second embodiment above, even when the administrator 1400 creates a file on the management software 600, effects similar to those of the first embodiment may be provided.

Third Embodiment

Referring to FIGS. 1 to 12, FIGS. 14 and 15, and FIGS. 18 to 20, a third embodiment of this invention is described. It should be noted that this embodiment is different from the first embodiment in that the processing executed by the management software 600 in the first embodiment is executed by an additional module 502 in this embodiment. Accordingly, an operation of the additional module 502 of this embodiment is different from that of the first embodiment.

A system configuration of this embodiment is similar to that of the first embodiment described above referring to FIGS. 1 to 5 except for unnecessity of a management server 200 and a LAN 301. A role of each software module is similar to that of the first embodiment except for the additional module 502. The conceptual diagrams and the management tables of the first embodiment illustrated in FIGS. 6 to 12 apply to this embodiment. However, in this embodiment, the management software 600 on the management server 200 is not necessary. To execute file creation illustrated in FIG. 14, the additional module 502 or the like must execute processing illustrated in FIG. 18 in advance, and the additional module 502 must hold a write destination candidate volume management table 1700. Processing illustrated in FIG. 15 is executed as in the first embodiment. However, in Step 1405, when an alert is issued to an administrator 1400 while the additional module 502 does not control a write destination, the alert is issued by a hypervisor 501.

Figure 18:
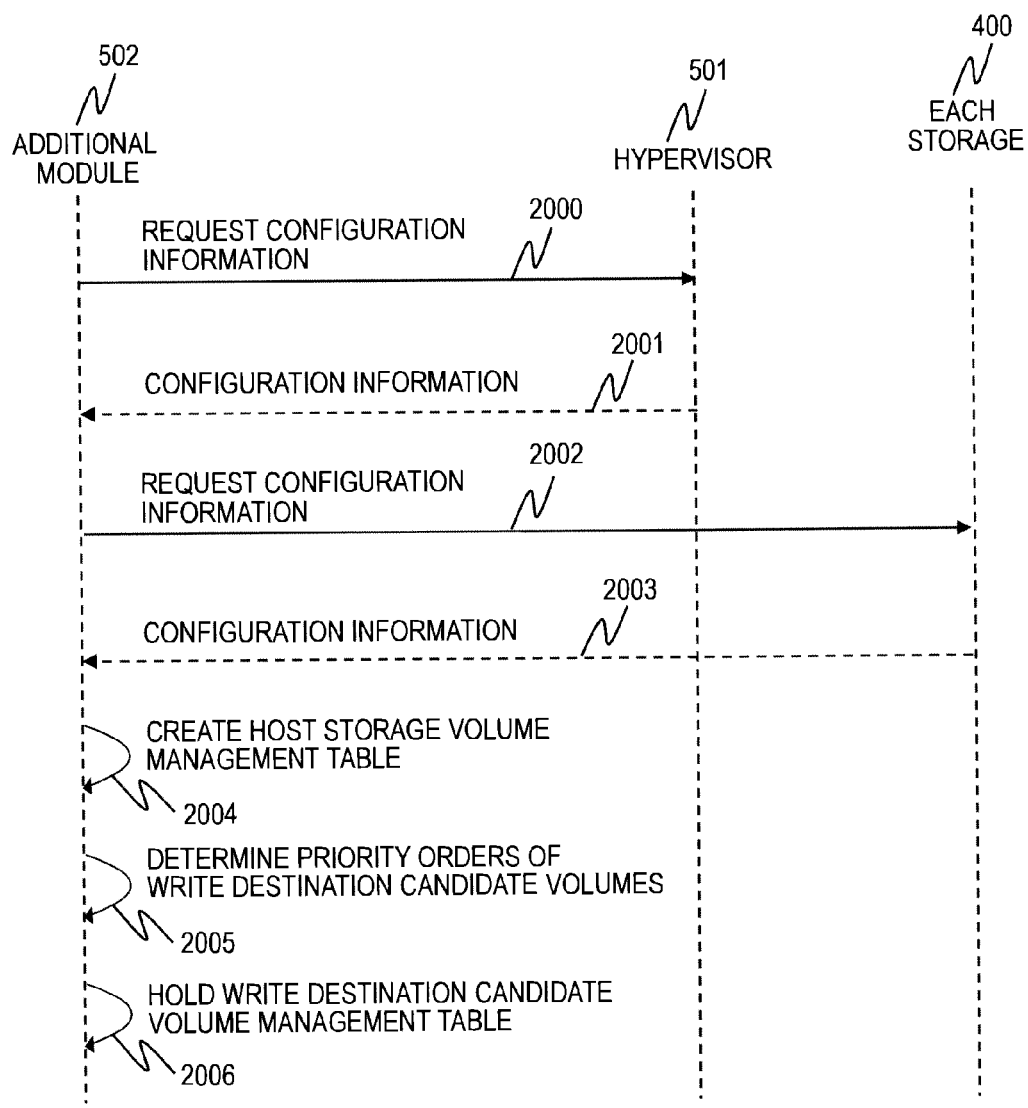
FIG. 18 is a sequential diagram illustrating processing from acquisition of pieces of configuration information of a hypervisor and each storage apparatus by an additional module to holding of a write destination candidate volume management table according to a third embodiment of this invention.

FIG. 18 is a sequential diagram illustrating processing from acquisition of pieces of configuration information of the hypervisor 501 and each storage apparatus 400 by the additional module 502 to holding of the write destination candidate volume management table 1700 by the additional module 502 according to the third embodiment of this invention.

It should be noted that this processing is repeatedly executed when necessary to update the write destination candidate volume management table 1700.

First, the additional module 502 requests the hypervisor 501 to transmit host side configuration information (Step 2000).

Then, the additional module 502 receives the host side configuration information from the hypervisor 501 (Step 2001). The configuration information to be acquired is an information item included in a host volume management table 2100. It should be noted that the acquired configuration information may include information other than the above-mentioned information. The hypervisor 501 may transmit the configuration information without any request from the additional module 502.

Then, the additional module 502 requests each storage apparatus 400 to transmit storage side configuration information (Step 2002).

Then, the additional module 502 receives the storage side configuration information from each storage apparatus 400 (Step 2003). The configuration information to be acquired is an identifier (storage ID) of each storage apparatus 400 and an information item included in a storage volume management table 2200. The acquired configuration information may include information other than the above-mentioned information. It should be noted that, in Step 2002 and Step 2003, SCSI Inquiry may be utilized to issue a request and transmit a response. In this case, the additional module 502 issues SCSI Inquiry to request configuration information, and each storage apparatus 400 stores the configuration information in a vendor-specific area of Inquiry Data to return the information.

Then, the additional module 502 creates a host storage volume management table 1600 based on the host volume management table 2100 and the storage volume management table 2200 (Step 2004). A creation method is similar to that of the first embodiment. Each row of the host storage volume management table 1600 is created by comparing rows of the host volume management table 2100 with those of the storage volume management table 2200, and coupling the rows having identical storage ID column 2102 and storage volume ID column 2103.

Then, the additional module 502 determines priority orders of write destination candidate volumes by the processing illustrated in FIG. 15 (Step 2005).

Then, the additional module 502 holds the write destination candidate volume management table 1700 (Step 2006).

According to the third embodiment above, even in the computer system that includes no management server 200, effects similar to those of the first embodiment may be provided.

The invention claimed is:

1. A computer system, comprising:
   one or ore storage apparatuses; and
   one or more host computers coupled to the one or more storage apparatuses, each of the one or more host computers comprising:
      a first interface coupled to the one or more storage apparatuses;
      a first processor coupled to the first interface; and
      a first storage device coupled to the first processor, the first processor being configured to control one or more virtual machines each configured to execute one or more application programs,
   wherein each of the one or more storage apparatuses comprises:
      a controller coupled to the one or more host computers; and
      one or more physical storage devices coupled to the controller, the each of the one or more storage apparatuses being configured to hold information associating a plurality of virtual volumes and a plurality of pools each including real storage areas of the one or more physical storage devices, wherein when a request to write data designating one of the plurality of virtual volumes as a volume of a write destination is received from the one or more host computers, the each of the one or more storage apparatuses is configured to allocate, to the virtual volume of the write destination, the real storage areas included in each of the plurality of pools corresponding to the virtual volume of the write destination, and to store the data in the allocated real storage areas, wherein the computer system is configured to:
    determine, based on the information held by the each of the one or more storage apparatuses, orders of priority of the volumes of the write destination by the one or more host computers; and
    hold the determined orders of priority, wherein the each of the one or more storage apparatuses is configured to hold information indicating amounts of the real storage areas not yet allocated to the plurality of virtual volumes of the real storage areas included in the each of the plurality of pools, and wherein the computer system is configured to determine the orders of priority based on the amounts of the real storage areas not yet allocated to the plurality of virtual volumes.

2. The computer system according to claim 1, wherein the computer system is configured to determine the orders of priority so that, as the amounts of the real storage areas not yet allocated to the plurality of virtual volumes of the real storage areas included in the each of the plurality of pools become larger, the orders of priority of the plurality of virtual volumes corresponding to the plurality of pools become higher.

3. The computer system according to claim 2, wherein the computer system is configured to:
    designate, when a tile creation instruction is input, one of the volumes having a highest order of priority as a write destination, and execute writing of a file to the one of the volumes designated as the write destination; and
    designate as a new write destination, when the writing of the file to the one of the volumes designated as the write destination has failed, another one of the volumes having the highest order of priority next to the one of the volumes designated as the write destination.

4. The computer system according to claim 3,
wherein the one or more host computers and the one or more storage apparatuses are mutually coupled via a first network,
wherein the computer system further comprises a management computer coupled to the one or more host computers and the one or more storage apparatuses via a second network,
wherein the management computer comprises:
    a second interface coupled to the second network;
    a second processor coupled to the second interface; and
    a second storage device coupled to the second processor,
wherein the management computer is configured to:
    acquire, from the one or more storage apparatuses via the second network, the information indicating the amounts of the real storage areas not yet allocated to the plurality of virtual volumes, of the real storage areas included in the each of the plurality of pools;
    determine the orders of priority so that, as the amounts of the real storage areas not yet allocated to the plurality of virtual volumes of the real storage areas included in the each of the plurality of pools become larger, the orders of priority of the plurality of virtual volumes corresponding to the plurality of pools become higher;
    hold the determined orders of priority; and
    create a file when the file creation instruction is input, and transmit, in addition to the created rile, as information designating a write destination of the created file, information identifying the one of the plurality of virtual volumes having the highest order of priority to the one or more host computers,
wherein the first processor is configured to control the one or more virtual machines by executing a virtual machine control program stored in the first storage device,
wherein the virtual machine control program controls, when the file and the information designating the write destination of the file are input, the first processor to execute processing of writing the tile in the designated write destination, and
wherein the one or more host computers is configured to write, in accordance with the virtual machine control program, the file received from the management computer in the one of the plurality of virtual volumes designated by the management computer.

5. The computer system according to claim 4,
wherein the each of the one or more storage apparatuses is further configured to manage one or more logical volumes to which the real storage areas arc allocated in advance and which are not associated with the plurality of pools,
wherein the each of the one or more host computers is configured to hold information indicating a free capacity of each of the plurality of virtual volumes, and
wherein the management computer is configured to:
    acquire, from the one or more host computers via the second network, the information indicating the free capacity of the each of the plurality of virtual volumes; and
    determine the orders of priority so that an order of priority of one of the one or more logical volumes that has a free capacity larger than a predetermined threshold value is higher than the orders of priority of the plurality of virtual volumes, so that an order of priority of one of the plurality of virtual volumes having a free capacity larger than the predetermined threshold value is higher than an order of priority of one of the plurality of virtual volumes having the free capacity that is smaller than the predetermined threshold value, and so that, as the amounts of the real storage areas not yet allocated to the plurality of virtual volumes of the real storage areas included in the each of the plurality of pools become larger, the orders of priority of the plurality of virtual volumes corresponding to the plurality of pools become higher.

6. The computer system according to claim 3,
wherein the one or more host computers and the one or more storage apparatuses arc mutually coupled via a first network,
wherein the computer system further comprises a management computer coupled to the one or more host computers and the one or more storage apparatuses via a second network,
wherein the management computer comprises:
    a second interface coupled to the second network;
    a second processor coupled to the second interface; and
    a second storage device coupled to the second processor, wherein the management computer is configured to:
acquire, from the one or more storage apparatuses via the second network, the information indicating the amounts of the real storage areas not yet allocated to the plurality of virtual volumes, of the real storage areas included in the each of the plurality of pools:
determine the orders of priority so that, as the amounts of the real storage areas not yet allocated to the plurality of virtual volumes of the real storage areas included in the each of the plurality of pools become larger, the orders of priority of the plurality of virtual volumes corresponding to the plurality of pools become higher; and
transmit information indicating the determined orders of priority to the one or more host computers,
wherein the first processor is configured to control the one or more virtual machines by executing a virtual machine control program stored in the first storage device,
wherein the each of the one or more host computers further comprises an additional program stored in the first storage device and executed by the first processor, and
wherein the each of the one or more host computers is configured to:
hold the information indicating the orders of priority received from the management computer;
create, when the file creation instruction is input, a file in accordance with the virtual machine control program; and
write the created file in the one of the volumes having the highest order of priority in accordance with the additional program.

7. The computer system according to claim 3,
wherein the one or more host computers and the one or more storage apparatuses are mutually coupled via a first network,
wherein the first processor is configured to control the one or more virtual machines by executing a virtual machine control program stored in the first storage device,
wherein the each of the one or more host computers further comprises an additional program stored in the first storage device and executed by the first processor, and
wherein the each of the one or more host computers is configured to:
acquire, in accordance with the additional program, from the one or more storage apparatuses via the first network, the information indicating the amounts of the real storage areas not yet allocated to the plurality of virtual volumes, of the real storage areas included in the each of the plurality of pools;
determine the orders of priority so that, as the amounts of the real storage areas not yet allocated to the plurality of virtual volumes of the real storage areas included in the each of the plurality of pools become larger, the orders of priority of the plurality of virtual volumes corresponding to the plurality of pools become higher;
hold the determined orders of priority;
create, when the file creation instruction is input, a file in accordance with the virtual machine control program; and
write the created file in the one of the volumes having the highest order of priority in accordance with the additional program.

8. The computer system according to claim 7, wherein the one or more host computers are configured to use SCSI Inquiry for communication with the one or more storage apparatuses via the first network in accordance with the additional program.

9. The computer system according o claim 2, wherein the computer system is configured to:
execute, when a tile creation instruction is input, writing of a file to any one of the volumes in accordance with the file creation instruction; and
output an alert when the order of priority of the any one of the volumes to which the file is written is lower than a predetermined order of priority.

10. A computer system, comprising:
one or more storage apparatuses; and
one or more host computers coupled to the one or more storage apparatuses, each of the one or more host computers comprising:
a first interface coupled to the one or more storage apparatuses;
a first processor coupled to the first interface; and
a first storage device coupled to the first processor, the first processor being configured to control one or more virtual machines each configured to execute one or more application programs,
wherein each of the one or more storage apparatuses comprises:
a controller coupled to the one or more host computers; and
one or more physical storage devices coupled to the controller, the each of the one or more storage apparatuses being configured to hold information associating a plurality virtual volumes and a plurality of pools each including real storage areas of the one or more physical storage devices,
wherein when a request to write data designating one of the plurality of virtual volumes as a volume of a write destination is received from the one or more host computers. the each of the one or more storage apparatuses is configured to allocate, to the virtual volume of the write destination, the real storage areas included in each of the plurality of pools corresponding to the virtual volume of the write destination, and to store the data in the allocated real storage areas,
wherein the computer system is configured to:
determine, based on the information held by the each of the one or more storage apparatuses, orders of priority of the volumes of the write destination by the one or more host computers; and
hold the determined orders of priority,
wherein the each of the one or more storage apparatuses is configured to hold information indicating I/O amounts to the plurality of pools, and
wherein the computer system is configured to determine the orders of priority so that, as the I/O amounts to the plurality of pools become smaller, the orders of priority of the plurality of virtual volumes corresponding to the plurality of pools become higher.

11. A control method for a computer system, the computer system comprising:
one or more storage apparatuses; and
one or more host computers coupled to the one or more storage apparatuses, each of the one or more host computers comprising:
a first interlace coupled to the one or more storage apparatuses;
a first processor coupled to the first interface; and first storage device coupled to the first processor, the first processor controlling one or more virtual machines each executing one or more application programs, wherein each of the one or more storage apparatuses comprises:
a controller coupled to the one or more host computers; and
one or more physical storage devices coupled to the controller, the each of the one or more storage apparatuses being configured to hold information associating a plurality of virtual volumes and a plurality of pools each including real storage areas of the one or more physical storage devices, wherein when a request to write data designating one of the plurality of virtual volumes as a volume of a write destination is received from the one or more host computers, the each of the one or more storage apparatuses is configured to allocate, to the one of the plurality of virtual volumes of the write destination, the real storage areas included in each of the plurality of pools corresponding to the one of the plurality of virtual volumes of the write destination, and to store the data in the allocated real storage areas, the control method comprising:
a first procedure of determining, based on the information held by the one or more storage apparatuses, orders of priority of the volumes of the write destination by the one or more host computers; and
a second procedure of holding the determined orders or priority, wherein the each of the one or more storage apparatuses is configured to hold information indicating amounts of the real storage areas not yet allocated to the plurality of virtual volumes, of the real storage areas included in the each of the plurality of pools, and wherein the first procedure comprises determining the orders of priority based on the amounts of the real storage areas not yet allocated to the plurality of virtual volumes.

12. The control method for a computer system according to claim 11, wherein the first procedure comprises determining the orders of priority so that, as the amounts of the real storage areas not yet allocated to the plurality of virtual volumes of the real storage areas included in the each of the plurality of pools become larger, the orders of priority of the plurality of virtual volumes corresponding to the plurality of pools become higher.

13. The control method for a computer system according to claim 12, further comprising a third procedure of designating, when a file creation instruction is input, one of the volumes having the highest order of priority as a write destination, and executing writing of a file to the one of the volumes designated as the write destination, wherein the third procedure comprises designating as a new write destination, when the writing of the file to the one of the volumes designated as the write destination has failed, another one of the volumes having the highest order of priority next to the one of the volumes designated as the write destination.

* * * * *